US011883970B2

(12) United States Patent
Hahn et al.

(10) Patent No.: US 11,883,970 B2
(45) Date of Patent: Jan. 30, 2024

(54) RAZOR WITH PIVOTING HEAD

(71) Applicant: Leaf Shave Company, Pittsburgh, PA (US)

(72) Inventors: Adam J. Hahn, Pittsburgh, PA (US); Adam Simone, Pittsburgh, PA (US)

(73) Assignee: Leaf Shave Company, Pittsburgh, PA (US)

( * ) Notice: Subject to any disclaimer, the term of this patent is extended or adjusted under 35 U.S.C. 154(b) by 0 days.

(21) Appl. No.: 17/132,209

(22) Filed: Dec. 23, 2020

(65) Prior Publication Data

US 2021/0107173 A1 Apr. 15, 2021

Related U.S. Application Data

(63) Continuation of application No. 14/947,012, filed on Nov. 20, 2015, now Pat. No. 10,906,196.

(60) Provisional application No. 62/082,653, filed on Nov. 21, 2014.

(51) Int. Cl.

| | |
|---|---|
| ***B26B 21/22*** | (2006.01) |
| ***B26B 21/52*** | (2006.01) |
| ***B26B 21/30*** | (2006.01) |
| ***B26B 21/40*** | (2006.01) |

(Continued)

(52) U.S. Cl.

CPC ............ *B26B 21/227* (2013.01); *B26B 21/18* (2013.01); *B26B 21/225* (2013.01); *B26B 21/30* (2013.01); *B26B 21/32* (2013.01); *B26B 21/4012* (2013.01); *B26B 21/521* (2013.01)

(58) Field of Classification Search

CPC ......... B26B 21/30; B26B 21/22; B26B 21/08; B26B 21/14; B26B 21/16; B26B 21/18; B26B 21/225; B26B 21/227; B26B 21/32; B26B 21/4012; B26B 21/4037; B26B 21/521

See application file for complete search history.

(56) References Cited

U.S. PATENT DOCUMENTS 850,929 A * 4/1907 Halbekann .............. B26B 21/30 30/58

927,588 A * 7/1909 O'Neill ................... B26B 21/16 30/83

(Continued)

FOREIGN PATENT DOCUMENTS

GB 171304 11/1921

OTHER PUBLICATIONS

"The Beluga Razor: A Barber Quality Shave . . . Minus the Barber"; Beluga Shave Co., https://www.kickstarter.com/projects/257125380/the-beluga-razor-a-barber-quality-shaveminus-the-b?ref=nav_search, 22 pages, Oct. 14, 2014.

*Primary Examiner* — Ghassem Alie
*Assistant Examiner* — Samuel A Davies
(74) *Attorney, Agent, or Firm* — The Webb Law Firm

(57) ABSTRACT

A shaving razor may include a handle, a head pivotally attached to the handle, the head may include a frame and a cover pivotally attached to the frame, and at least one separation member provided between the frame and the cover of the head. The at least one separation member may be movable relative to the frame and the cover of the head. A shaving razor may include a handle and a head pivotally attached to the handle. The head may be configured to receive at least two independently replaceable razor blades.

14 Claims, 25 Drawing Sheets

(51) Int. Cl.
*B26B 21/18* (2006.01)
*B26B 21/32* (2006.01)

(56) References Cited

U.S. PATENT DOCUMENTS

| | | | | | |
|---|---|---|---|---|---|
| 933,415 | A | * | 9/1909 | Brunacci | B26B 21/32 30/59 |
| 956,532 | A | | 5/1910 | Kieselhorst | |
| 1,060,657 | A | | 5/1913 | Alter | |
| 1,159,487 | A | | 11/1915 | Fuller | |
| 1,205,187 | A | | 11/1916 | Fuller | |
| 1,206,315 | A | | 11/1916 | Ehrlich | |
| 1,220,837 | A | | 3/1917 | Fuller | |
| 1,367,158 | A | | 2/1921 | McAuliffe | |
| 1,411,287 | A | | 4/1922 | McAuliffe | |
| 1,425,463 | A | * | 8/1922 | Fischer | B26B 21/30 30/61 |
| 1,469,309 | A | * | 10/1923 | Lacy | B26B 21/18 30/76 |
| 1,482,371 | A | | 1/1924 | Witter | |
| 1,492,246 | A | | 4/1924 | Gaisman | |
| 1,497,030 | A | | 6/1924 | Salerni | |
| 1,522,716 | A | | 1/1925 | Frank | |
| 1,548,471 | A | | 8/1925 | Kepka | |
| 1,550,178 | A | * | 8/1925 | Logan | B26B 21/16 30/84 |
| 1,550,861 | A | | 8/1925 | Wolcott | |
| 1,552,234 | A | | 9/1925 | Roebuck | |
| 1,581,469 | A | | 4/1926 | Oskin | |
| 1,633,139 | A | | 6/1927 | Staats-Oels | |
| 1,635,827 | A | | 7/1927 | Frank | |
| 1,694,337 | A | | 12/1928 | Oberheim | |
| 1,710,548 | A | | 4/1929 | Minahan | |
| 1,719,675 | A | | 7/1929 | Sirch | |
| 1,734,524 | A | | 11/1929 | Kohlmiller | |
| 1,744,752 | A | | 1/1930 | Crespo | |
| 1,805,895 | A | | 5/1931 | Watson | |
| 1,826,410 | A | | 10/1931 | Aronson | |
| 1,853,839 | A | | 4/1932 | Wolcott | |
| 1,859,555 | A | | 5/1932 | De Haven | |
| 1,871,789 | A | | 8/1932 | Green | |
| 1,883,324 | A | * | 10/1932 | Aronson | B26B 21/30 451/158 |
| 1,887,911 | A | | 11/1932 | Aronson | |
| 1,901,591 | A | | 3/1933 | Godshalk | |
| 1,905,331 | A | | 4/1933 | Aronson | |
| 1,907,783 | A | | 5/1933 | Gaisman | |
| 1,914,630 | A | | 6/1933 | Aronson | |
| 1,920,711 | A | | 8/1933 | Pelizzola | |
| 1,929,463 | A | | 10/1933 | Wolcott | |
| 1,932,386 | A | | 10/1933 | Aronson | |
| 1,952,253 | A | | 3/1934 | Hoff | |
| 1,954,259 | A | | 4/1934 | Norviel | |
| 1,959,841 | A | | 5/1934 | Sage | |
| 1,965,348 | A | | 7/1934 | Lucia | |
| 1,966,425 | A | | 7/1934 | Aronson | |
| 1,966,426 | A | | 7/1934 | Aronson | |
| 1,978,988 | A | | 10/1934 | Cook et al. | |
| 2,001,155 | A | | 5/1935 | Peters | |
| 2,026,125 | A | | 12/1935 | Godshalk et al. | |
| 2,048,868 | A | | 7/1936 | Johnston | |
| 2,062,683 | A | | 12/1936 | Smith | |
| 2,090,968 | A | | 8/1937 | Testi | |
| 2,103,924 | A | | 12/1937 | Young | |
| 2,121,000 | A | | 6/1938 | Anderson | |
| 2,125,135 | A | | 7/1938 | Trippe | |
| 2,252,499 | A | | 8/1941 | Flaws, Jr. | |
| 2,252,569 | A | | 8/1941 | Kennison | |
| 2,290,964 | A | | 7/1942 | Hill | |
| 2,319,488 | A | | 5/1943 | Burchett | |
| 2,397,555 | A | | 4/1946 | Lotthamer | |
| 2,429,334 | A | | 10/1947 | Smith | |
| 2,458,257 | A | | 1/1949 | Donovan | |
| 2,565,281 | A | | 8/1951 | Thomas | |
| 2,581,214 | A | | 1/1952 | Stegner | |
| 2,602,220 | A | | 7/1952 | Ewing | |
| 2,602,221 | A | | 7/1952 | Ewing et al. | |
| 2,640,258 | A | | 6/1953 | Eckert | |
| 2,769,232 | A | | 11/1956 | Leonard, Sr. | |
| 2,780,866 | A | | 2/1957 | Borden | |
| 2,787,921 | A | | 4/1957 | Blankenship | |
| 2,839,829 | A | | 6/1958 | Knapp | |
| 2,911,712 | A | | 11/1959 | Choclin et al. | |
| 3,057,062 | A | | 10/1962 | Mashiba | |
| 3,080,651 | A | | 3/1963 | La Cas | |
| 3,101,536 | A | | 8/1963 | Bringewald | |
| 3,167,888 | A | | 2/1965 | Shanley | |
| 3,199,252 | A | | 8/1965 | Hanchey | |
| 3,653,123 | A | | 4/1972 | King et al. | |
| 3,777,396 | A | | 12/1973 | Simonetti | |
| 3,786,563 | A | | 1/1974 | Dorion, Jr. et al. | |
| 3,950,849 | A | | 4/1976 | Perry | |
| 3,964,159 | A | | 6/1976 | Ferraro | |
| 4,265,055 | A | | 5/1981 | Cartwright et al. | |
| 4,288,920 | A | | 9/1981 | Douglass et al. | |
| 4,345,374 | A | | 8/1982 | Jacobson | |
| 4,409,735 | A | | 10/1983 | Cartwright et al. | |
| 4,485,554 | A | | 12/1984 | Bergamaschi | |
| 4,608,782 | A | | 9/1986 | Chylinski | |
| 4,709,475 | A | * | 12/1987 | Phung | B26B 21/12 132/76.2 |
| 4,715,120 | A | | 12/1987 | McGready | |
| 4,807,401 | A | | 2/1989 | Atwater | |
| 4,860,449 | A | | 8/1989 | Duncan | |
| 4,970,784 | A | * | 11/1990 | Althaus | B26B 21/225 30/527 |
| 5,036,731 | A | | 8/1991 | Fletcher | |
| 5,139,138 | A | | 8/1992 | Isaksen | |
| 5,305,811 | A | * | 4/1994 | Schaefer | B27L 11/005 407/45 |
| 5,333,382 | A | | 8/1994 | Buchbinder | |
| 5,522,137 | A | | 6/1996 | Andrews | |
| 5,848,475 | A | | 12/1998 | Hill et al. | |
| 6,164,290 | A | | 12/2000 | Andrews | |
| 6,385,850 | B1 | | 5/2002 | Coulthard, Jr. | |
| 6,449,849 | B1 | | 9/2002 | Hackerman | |
| 6,772,523 | B1 | | 8/2004 | Richard et al. | |
| 6,807,739 | B2 | | 10/2004 | Follo | |
| 7,104,874 | B1 | | 9/2006 | Gussack et al. | |
| 7,191,523 | B2 | | 3/2007 | Miyazaki et al. | |
| 8,074,535 | B2 | | 12/2011 | Martell | |
| 8,499,459 | B2 | * | 8/2013 | Efthimiadis | B26B 21/4037 30/527 |
| 8,726,520 | B1 | | 5/2014 | Abraham | |
| 2002/0157259 | A1 | | 10/2002 | Coffin | |
| 2004/0177511 | A1 | | 9/2004 | Miyazaki et al. | |
| 2009/0000426 | A1 | | 1/2009 | Andersen et al. | |
| 2010/0139103 | A1 | | 6/2010 | Miyazaki | |
| 2010/0223792 | A1 | | 9/2010 | Martell | |
| 2012/0311865 | A1 | * | 12/2012 | Hamilton | B23K 26/40 30/50 |
| 2013/0237134 | A1 | | 9/2013 | Worthington | |
| 2014/0190014 | A1 | | 7/2014 | Hahn | |
| 2015/0360375 | A1 | | 12/2015 | Wertz | |

* cited by examiner

RAZOR WITH PIVOTING HEAD

CROSS REFERENCE TO RELATED APPLICATION

This application is a continuation of U.S. patent application Ser. No. 14/947,012, filed Nov. 20, 2015, which claims the benefit of U.S. Provisional Patent Application No. 62/082,653, filed Nov. 21, 2014, the disclosures of which are herein incorporated by reference in their entireties.

BACKGROUND OF THE INVENTION

Field of the Invention

This disclosure relates generally to razors and, more particularly, to a razor with a pivoting head and replaceable blades.

Description of Related Art

Razors have become ubiquitous and are used by both men and women for their personal shaving needs. Straight-blade razors, which are made of high carbon or stainless steel, exemplify the early modern popular style of shaving implements. These razors can be used for many shaving sessions over a longer period of time, but must be maintained by regular sharpening or stropping. The process of sharpening, or honing, the blade uses an abrasive material that removes material from the blade's edge. Stropping, which must be done with each use of a straight-blade razor, straightens and re-aligns the blade, which tends to bend and pit under use preventing a close shave if not straightened.

Double-edged safety razors replaced the straight edge in popularity in the early part of the twentieth century. The disposal of blades after limited use was made popular and economical by the arrival of blades made of low-cost, thin steel, thereby eliminating the need for stropping or honing. The safety feature of these razors, protecting the user from all but the very edge of the blade, appealed to the user. The orientation of the handle and the blade required the user to develop the proper technique to achieve an optimal shave. The next evolution combined the safety of small, thin blades exposed only at the edge with the proper angle-of-attack and a pivoting head to adjust to the contours of the body. The disposable razor embodied the ease and simplicity of shaving, sacrificing longevity of product by providing disposable blades with limited life. This incarnation of men's and women's personal shavers remains the most popular and widely used, contributing a sizeable negative global economic impact.

While the convenience and ease of use of current disposable razor technology is attractive to users, alternative razors using double-edged blades have continued to evolve. Many of the current safety razors use one double-edged blade and clamp the blade to the head of the safety razor to hold it rigidly in place. Typically, one blade edge is exposed on each side of the razor head. Many of these safety razors, however, do not include a pivoting head, thereby requiring a user to hold the razor and blade at a specific angle to his/her face to receive a proper shave. This can lead to a tedious process that does not always provide the close shave that one desires.

SUMMARY OF THE INVENTION

In view of the foregoing, a need exists for a razor including a pivoting head that provides an effective method of replacing the razor blades. A further need exists for a razor that provides multiple cutting edges on one side of the head by using a single double-edged razor blade. A further need exists for a razor including a pivoting head that provides a secure and easily removable cover for holding the double-edged razor blades.

In accordance with one aspect of the disclosure, a shaving razor may include a handle, a head pivotally attached to the handle, the head may include a frame and a cover pivotally attached to the frame, and at least one razor blade separation member provided between the frame and the cover of the head.

The at least one separation member may be moveable relative to at least one of the frame and the cover of the head. A releasable locking mechanism may be provided on the head and configured to hold the frame and cover together. The releasable locking mechanism may include a thumbscrew, a shaft extending from the thumbscrew and through the frame, the separation member, and the cover, and a threaded portion provided on an end of the shaft opposite the thumbscrew. The threaded portion may be removably threaded into the cover. The releasable locking mechanism may include a release lever, a retaining member extending from the release lever, and at least one spring member positioned on the retaining member. The at least one spring member may create a biasing force on the locking mechanism to keep the locking mechanism in a locked position until the release lever is actuated. The releasable locking mechanism may include at least one magnet positioned on the cover and at least one magnet positioned on the frame. The at least one magnet on the cover may be configured to create a magnetic connection between the at least one magnet on the frame to hold the cover and the frame together in a locked position. At least one razor blade may be provided in the head. The at least one razor blade may include two razor blades positioned on opposing sides of the separation member. A stepped locking abutment may extend from the frame and may be configured to position the at least two razor blades in a stepped arrangement within the head. The razor blades may be removably provided within the head. A dimension of a first gap defined between the at least one separation member and the frame may be different from a dimension of a second gap between the at least one separation member and the cover. At least one magnet may be positioned on the at least one separation member. The at least one separation member may include at least one stop member that extends therefrom, and the frame may include at least one stop member that extends therefrom. The stop members may be configured to retain a razor blade on each of the at least one separation member and the frame. The at least one stop member extending from the frame may be positioned closer to a shaving edge of the shaving razor than the at least one stop member extending from the at least one separation member. The frame may include a shaving edge including an extension member. The extension member may define a recessed portion that lifts a user's hair from his/her skin during shaving.

In accordance with another aspect of the disclosure, a shaving razor may include a handle, and a head pivotally attached to the handle. The head may be configured to receive at least two independently replaceable razor blades.

Each replaceable razor blade may include a blade body that tapers to at least one razor edge. Each replaceable razor blades may be one half of a full razor blade. At least one separation member may be provided between a frame and a cover of the head, such that the replaceable razor blades are receivable on opposing sides of the separation member. The at least one separation member may include at least one stop member that extends therefrom, and the frame includes at least one stop member that extends therefrom. The stop members may be configured to retain a razor blade on each of the at least one separation member and the frame. The at least one stop member extending from the frame may be positioned closer to a shaving edge of the shaving razor than the at least one stop member extending from the at least one separation member. A dimension of a first gap defined between the at least one separation member and the frame may be different from a dimension of a second gap defined between the at least one separation member and the cover.

Further details and advantages will be understood from the following detailed description read in conjunction with the accompanying drawings.

DESCRIPTION OF THE DISCLOSURE

For purposes of the description hereinafter, spatial orientation terms, as used, shall relate to the referenced aspect as it is oriented in the accompanying drawings, figures, or otherwise described in the following detailed description. However, it is to be understood that the aspects described hereinafter may assume many alternative variations and configurations. It is also to be understood that the specific components, devices, features, and operational sequences illustrated in the accompanying drawings, figures, or otherwise described herein are simply exemplary and should not be considered as limiting.

The present disclosure is directed to, in general, a razor and, in particular, a razor with a pivoting head and replaceable blades. Certain preferred and non-limiting aspects of the components of the razor are illustrated in FIGS. 1-31, 33, and 34.

With reference to FIGS. 1-4, one aspect of a shaving razor 2 is described. The razor 2 may include a handle 4 and a head 6. In one aspect, the head 6 may be pivotable or rotatable relative to or about the handle 4, as described hereinbelow. The head 6 may have a substantially rectangular shape. In one aspect, the handle 4 may have a substantially triangular cross-sectional shape. However, it is also contemplated that alternative shapes may be used, such as circular, oval, square, or trapezoidal. The handle 4 may include a first extension member **8*a* and a second extension member 8*b*. The first and second extension members 8*a*, 8*b* may extend from a distal end of the handle 4. The distal end of the handle 4 may be understood to be the end of the handle 4 that is not held by a user during use of the razor 2. The first and second extension members 8*a*, 8*b* may define an aperture 10 therebetween. It is also contemplated that the aperture 10 may not be defined by the first and second extension members 8*a*, 8*b*, and the handle 4 may be formed as a single monolithic structure. The handle 4** may include different types of surfaces, including small protrusions, bumps, waves, or indentations, to provide a comforting ergonomic feel when held by an individual.

Figure 1:
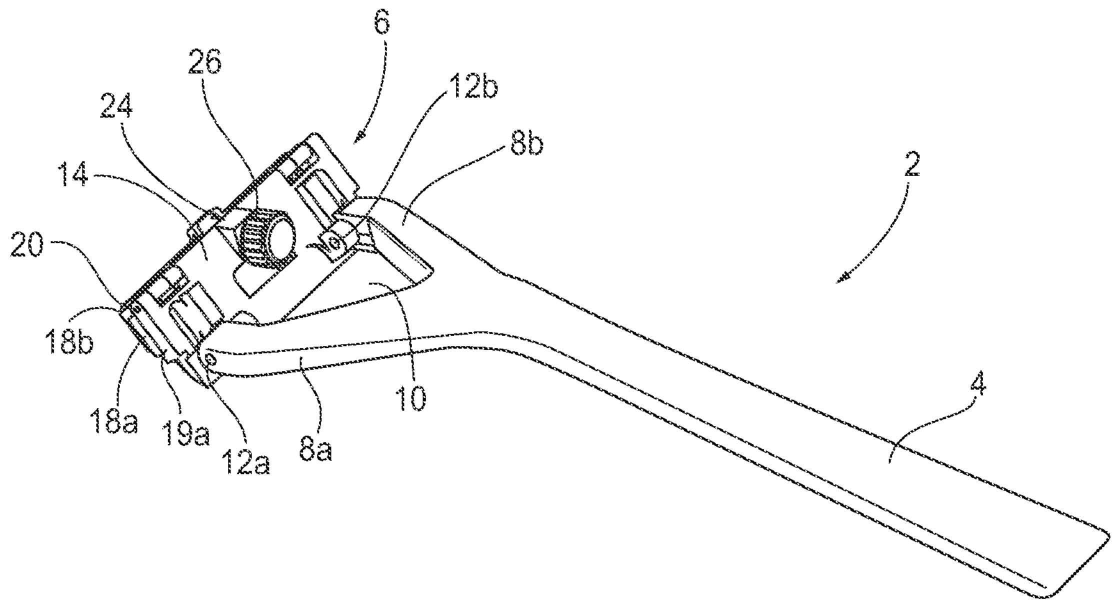
FIG. 1 is a top perspective view of a razor in accordance with one aspect of the present disclosure.
Figure 2:
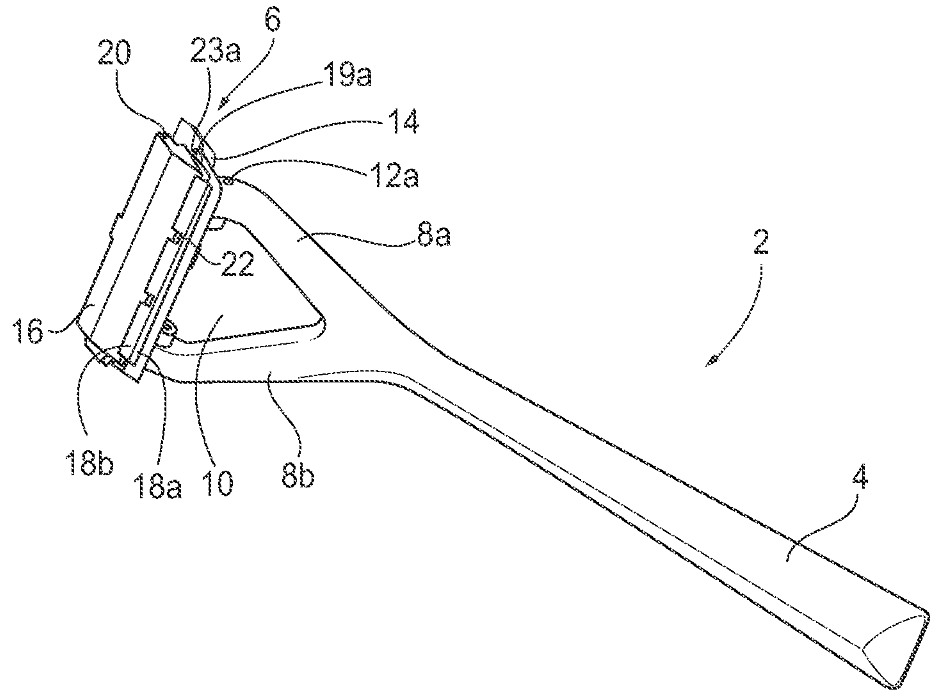
FIG. 2 is a bottom perspective view of the razor of FIG. 1.
Figure 3:
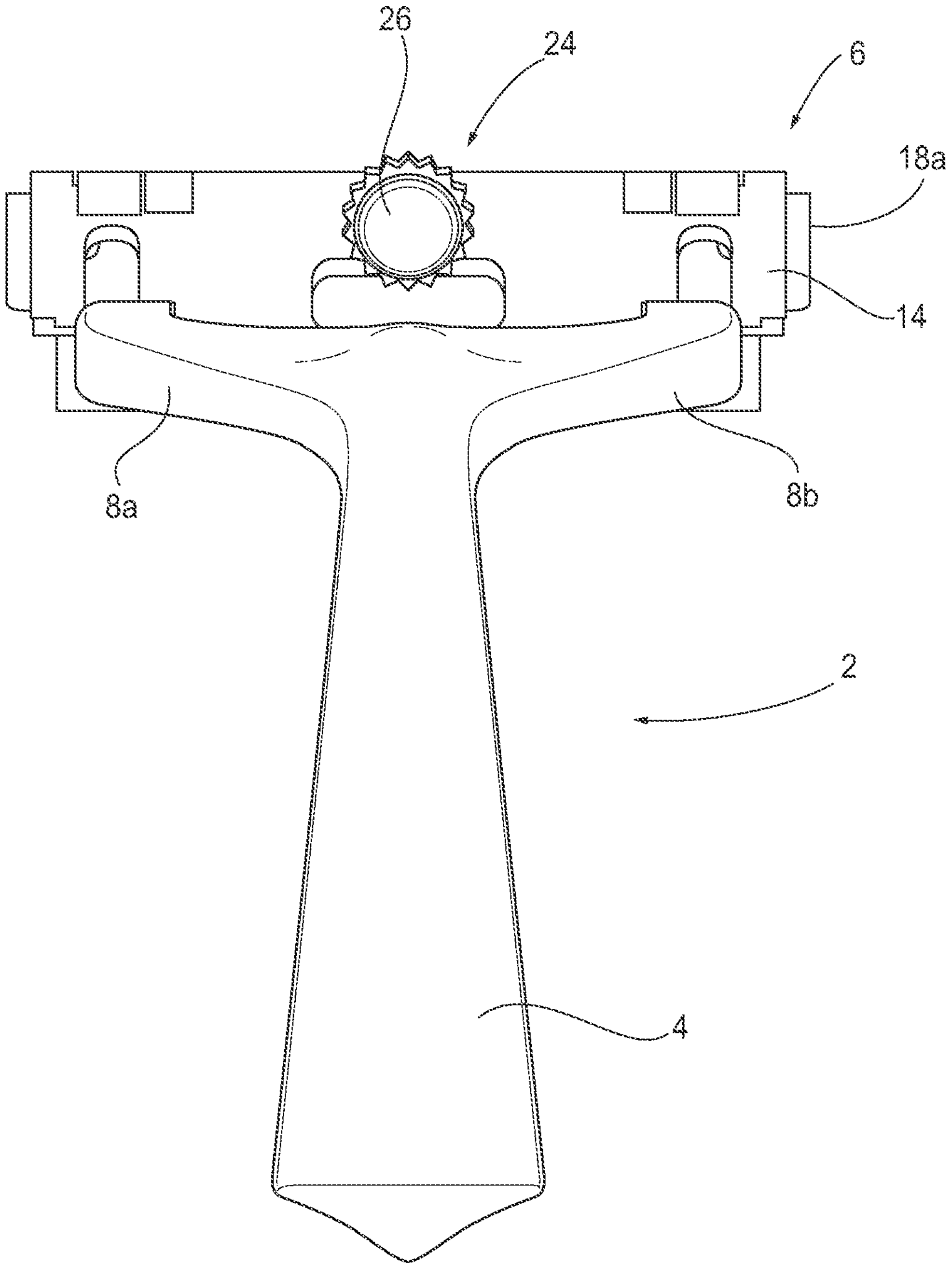
FIG. 3 is a rear perspective view of the razor of FIG. 1.
Figure 4:
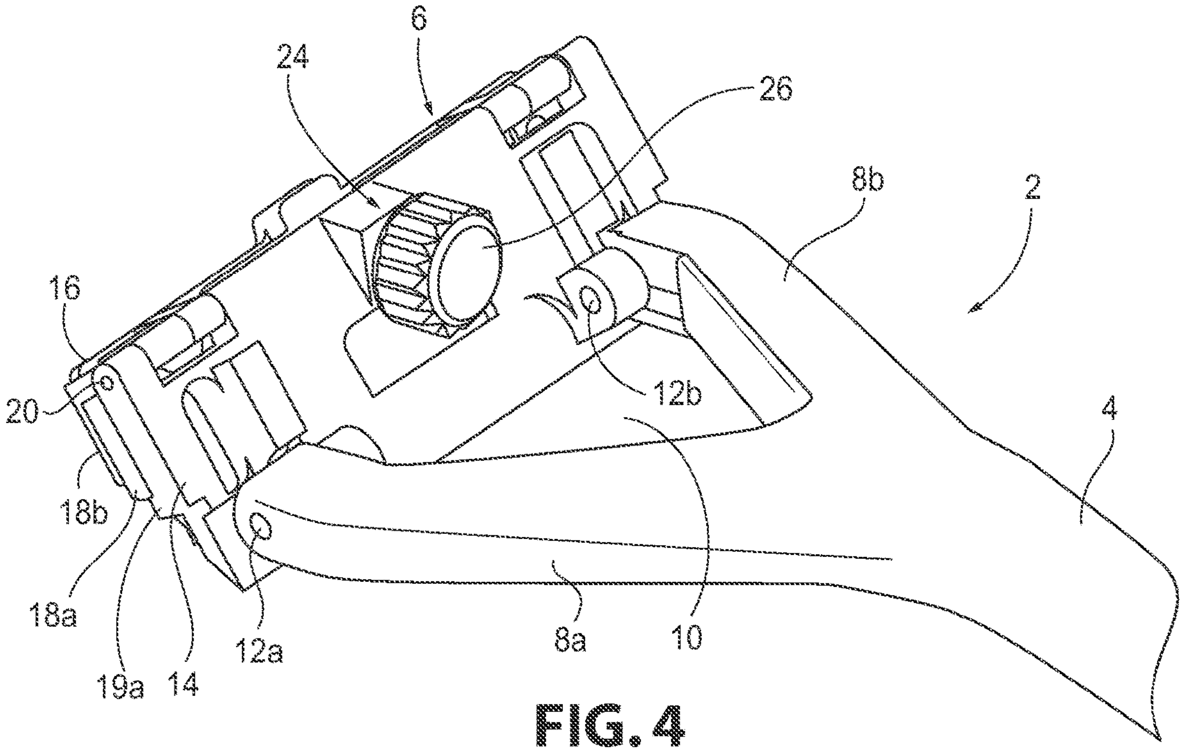
FIG. 4 is a rear perspective view of a head of the razor of FIG. 1.

With reference to FIGS. 3 and 4, the head 6 may be positioned on the distal ends of the first and second extension members **8*a*, 8*b*. In one aspect, the head 6 may be attached to the first and second extension members 8*a*, 8*b* by pins 12*a*, 12*b*. The pins 12*a*, 12*b* may be provided in apertures defined in the distal ends of the first and second extension members 8*a*, 8*b* and may allow the head 6 to freely rotate and/or pivot about the handle 4. In one aspect, separate pins 12*a*, 12*b* may be inserted through each extension member 8*a*, 8*b*. In another aspect, one pin may be inserted through both extension members 8*a*, 8*b*. By permitting rotation or pivoting of the head 6 relative to the handle 4, the razor 2 may be configured to set the blade and/or blades at the correct angle when pressure is applied to an individual's face. It is also contemplated that the head 6 may be spring-loaded on the handle 4 so the head 6 is returned to a resting position after being rotated relative to the handle 4**.

Figure 31:
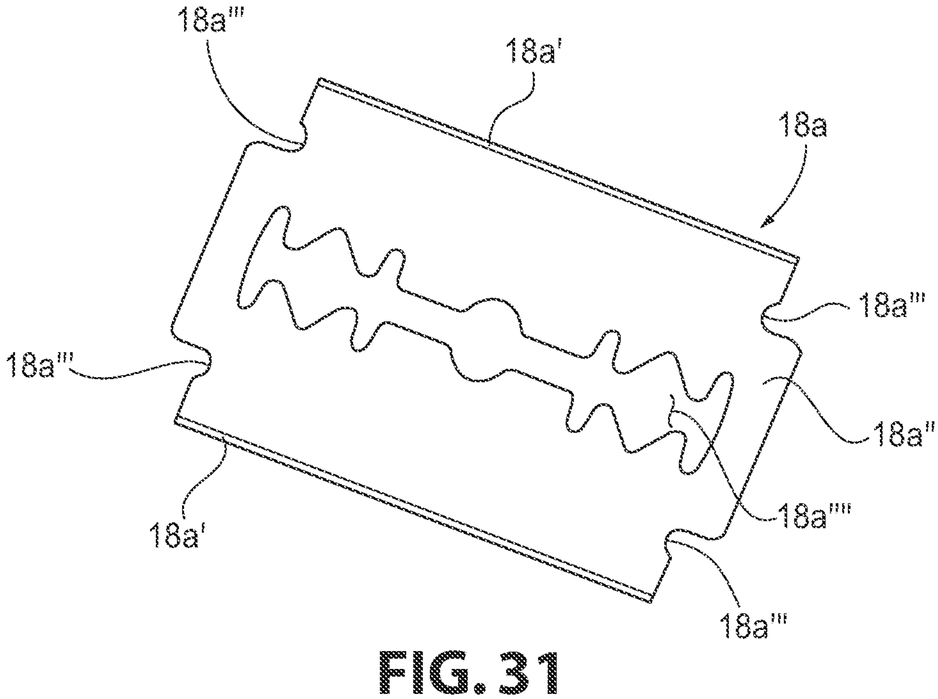
FIG. 31 is a front perspective view of a double-edged razor blade in accordance with an aspect of the present disclosure.

With reference to FIGS. 1-4, the head 6 may include a frame 14 and a cover 16. The frame 14 may be attached to the first and second extension members **8*a*, 8*b* via the pins 12*a*, 12*b*. By connecting the frame 14 to the extension members 8***a*, 8*b* via the pins 12*a*, 12*b*, the frame 14 may also be rotated and/or pivoted about the handle 4. The frame 14 and cover 16 may be configured to hold together two blades 18*a*, 18*b* in the head 6. It is also contemplated that the frame 14 and cover 16 may hold one blade or more than two blades in the head 6. In one aspect, the blades 18*a*, 18*b* may be formed from a double-edged razor blade. An example of such a double-edge razor blade 18*a* is shown in FIG. 31. As used herein, the "shaving edge" or like terms of the razors of the present invention refers to a leading surface or portion of the head 6, such that, when in use, the shaving edge is followed by the exposed razor edges 18*a*' that contact a user's skin. Typically, double-edged razor blades include two opposing razor edges 18*a*' connected by a weak or thin body member 18*a*" that defines perimeter profile portions 18*a*'" and a profiled cut-out 18*a*"". Razor blade 18*a* is shown as a conventional double-edged blade, but this is not meant to be limiting. It should be appreciated that razor edge 18*a*' of razor blade 18*a* includes an outermost edge for contacting skin with the razor edge 18*a*' tapering from the razor body 18*a*". Other embodiments of razor blades (single-edged and double-edged) with various perimeter profiles and/or central cut-out profiles are encompassed within the present invention. Presently, many manufacturers make these types of double-edged razor blades that use a standardized shape to fit in traditional safety razors. In one aspect, the blades 18*a*, 18*b* of the razor 2 may be this type of double-edged blade. By "weak and thin", it is meant that the blades are typically designed so that an individual can break a double-edged razor blade in half by hand, splitting along a centerline of profile cut-out 18*a*"". By breaking the double-edged razor blades in half, two "half blades" or two halves of the double-edged razor blade are provided. Each half may include one razor edge. It is also to be understood that the "half blades" may be provided in this initial form, without the need for breaking a double-edged razor blade in half. By using the "half blades" in the head 6, the razor 2 may provide a multi-razor blade configuration for shaving an individual's face. While it is contemplated that any type of double-edged razor blade may be used with the razor 2, it is also contemplated that specific "half blades" may be designed and configured to custom fit in the frame 14 and cover 16 of the head 6.

Figure 5:
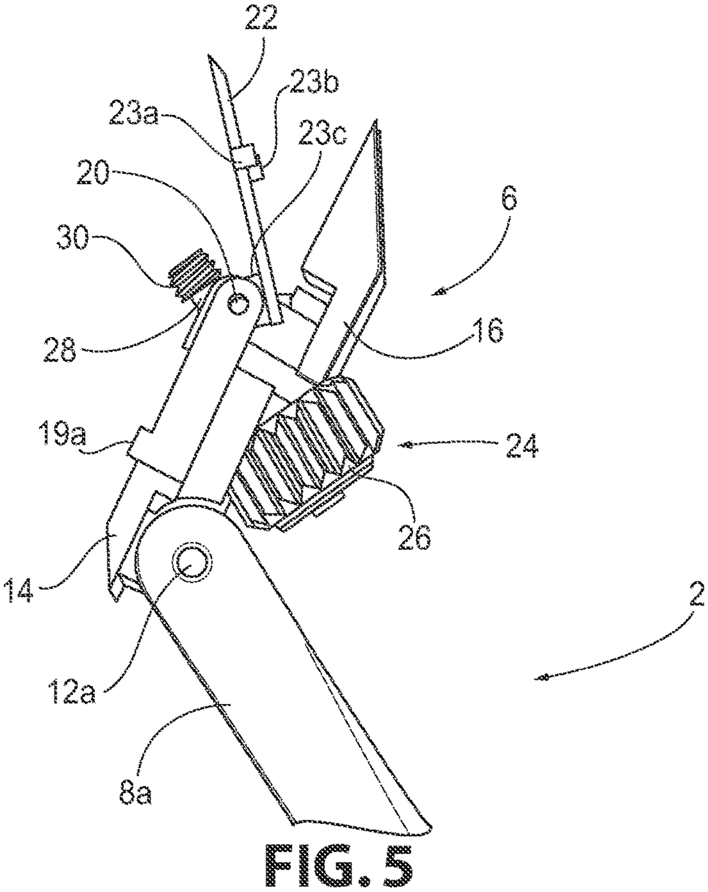
FIG. 5 is a side view of a cover of the razor of FIG. 1, without razor blades, provided in an open position.
Figure 6:
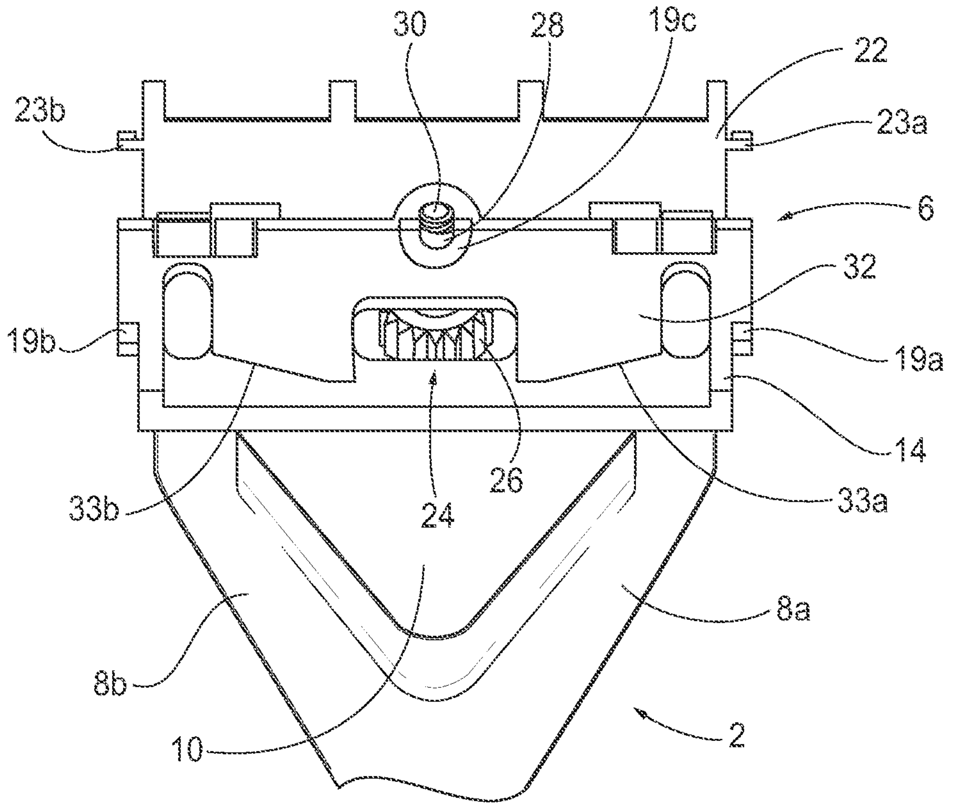
FIGS. 6-10 are bottom views of the cover of FIG. 3 illustrating a method of replacing razor blades in the razor.

As shown in FIG. 5, the frame 14 may be connected to the cover 16 via another pin 20. In this configuration, the cover 16 may be rotatable and/or pivotable about the pin 20 and thereby the frame 14. In this aspect, the cover 16 may not be removable from the head 6 so that the cover 16 is not lost or damaged. It is also contemplated, however, that the cover 16 may be fully removable from the head 6. The cover 16 may be configured in at least two positions, including an open position and a closed position. In the open position, the cover 16 may be rotated relative to the frame 14 to allow for the removal and replacement of the blades 18*a*, 18*b* in the head 6. In the closed position, the cover 16 may be positioned on top of the frame 14 to retain the blades 18*a*, 18*b* in the head 6. A separation member 22 may also be provided in the head 6. The separation member 22 may be configured to separate the blades 18*a*, 18*b* from each other in the head 6. In one aspect, the separation member 22 may be positioned between the blades 18*a*, 18*b* when the blades 18*a*, 18*b* are retained in the head 6. The separation member 22 may be rotatably attached to the pin 20 and positioned within and between the frame 14 and cover 16. The separation member 22 may be rotatable and/or pivotable relative to the frame 14 and cover 16. As shown in FIG. 6, a bottom blade seat 32 may protrude or extend from a top surface of the frame 14. The bottom blade seat 32 may be an integral extension of the frame 14 so that the bottom blade seat 32 is rotatable about the handle 4. It is also contemplated that the bottom blade seat 32 may be a separate component from the frame 14, which is separately rotatable about the handle 4. The bottom blade seat 32 may define at least two angled surfaces 33*a*, 33*b* that may be configured to effectively direct water flow through the head 6 during cleaning of the razor 2.

Figure 7:
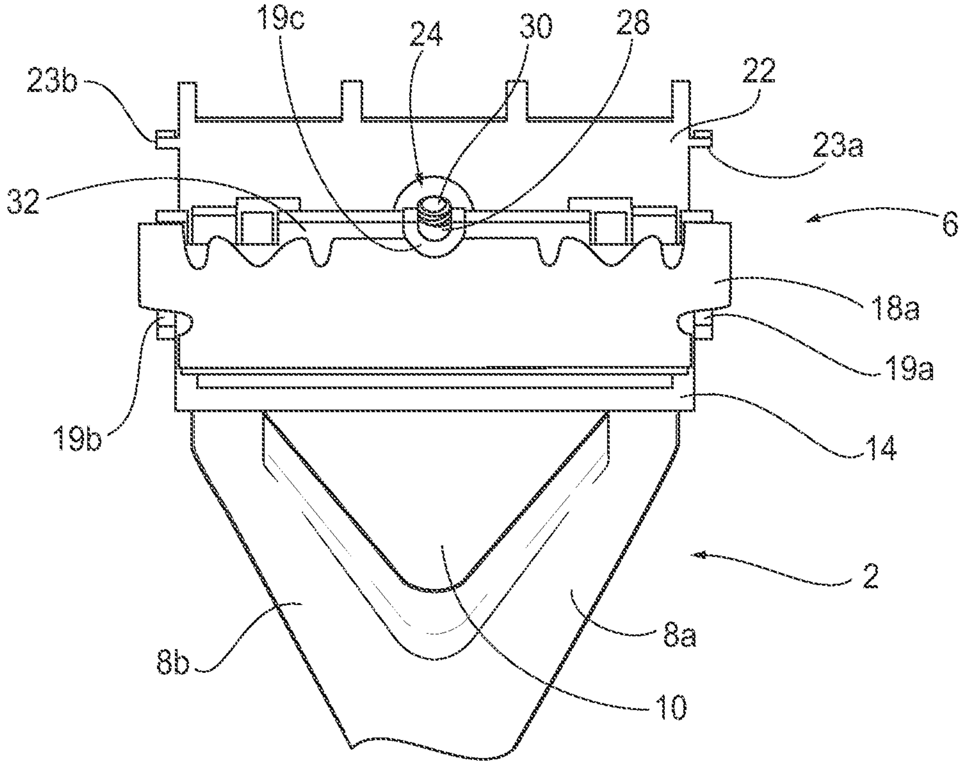

With reference to FIGS. 1-10, the razor 2 may also include several components to assist in the insertion and retention of the blades 18*a*, 18*b* in the head 6. As best shown in FIGS. 6 and 7, at least two stop members 19*a*, 19*b* may extend from the frame 14. The stop members 19*a*, 19*b* may be configured to permit the bottom blade 18*a* to rest on the stop members 19*a*, 19*b* so the blade 18*a* cannot slide in a downward direction out of the frame 14. The stop members 19*a*, 19*b* may also assist in stopping the blade 18*a* from moving in a left-right lateral direction. Further, another stop member 19*c* may be provided on an upper peripheral edge of the frame 14. The stop member 19*c* may extend from the frame 14 and may define a semi-circular shape. The stop member 19*c* may be configured to fit within a groove on a top portion of the blade 18*a*. When the blade 18*a* is positioned against the stop member 19*c*, the blade 18*a* may not move in an upward direction relative to the frame 14. Therefore, by retaining the blade 18*a* within the stop members 19*a*-19*c*, the blade 18*a* may be properly aligned in the head 2.

Figure 8:
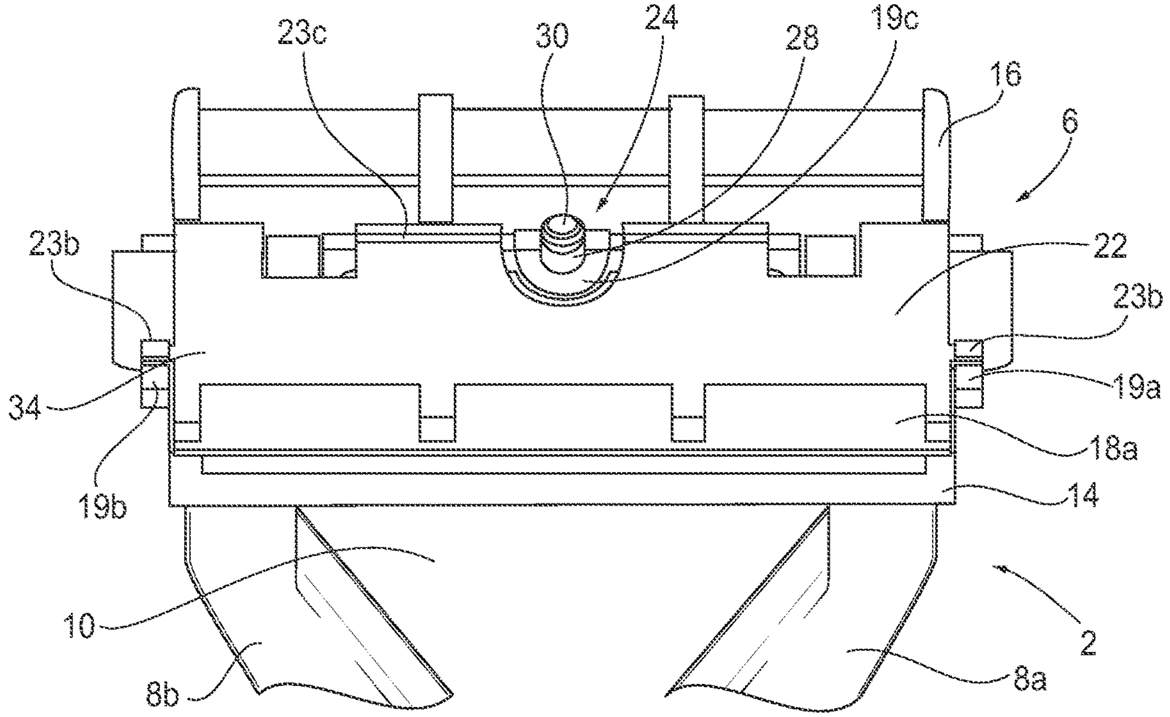
Figure 9:
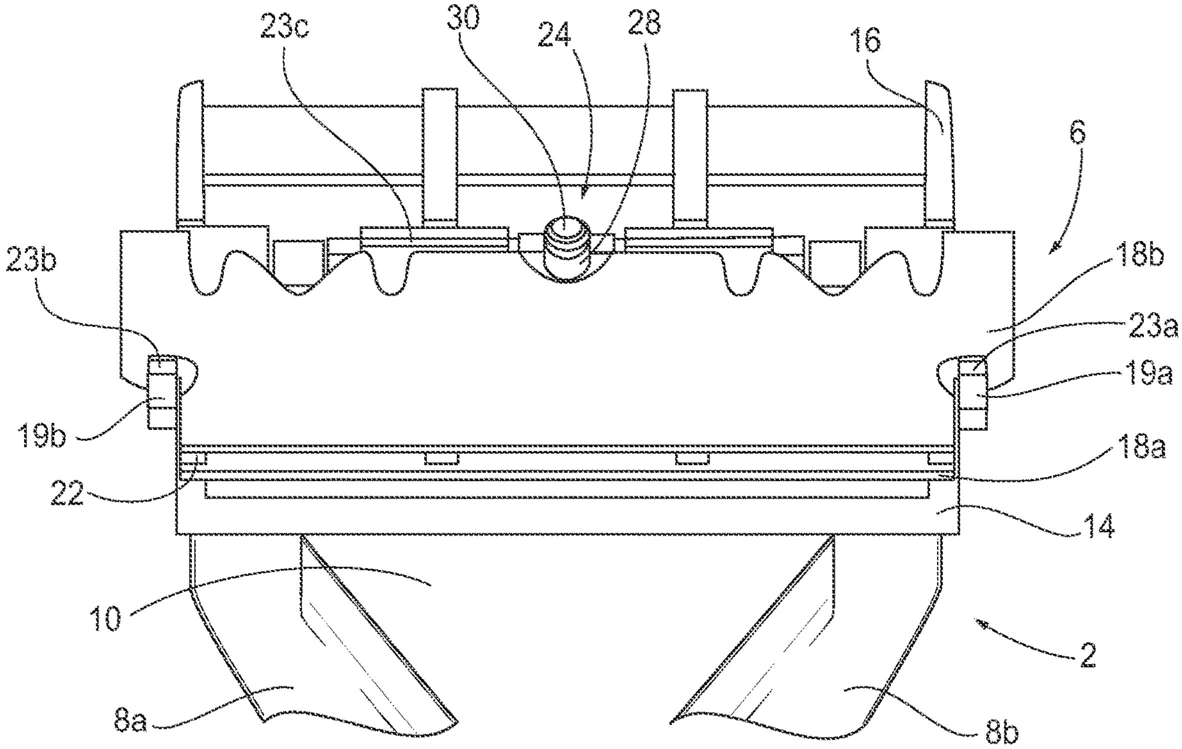
Figure 10:
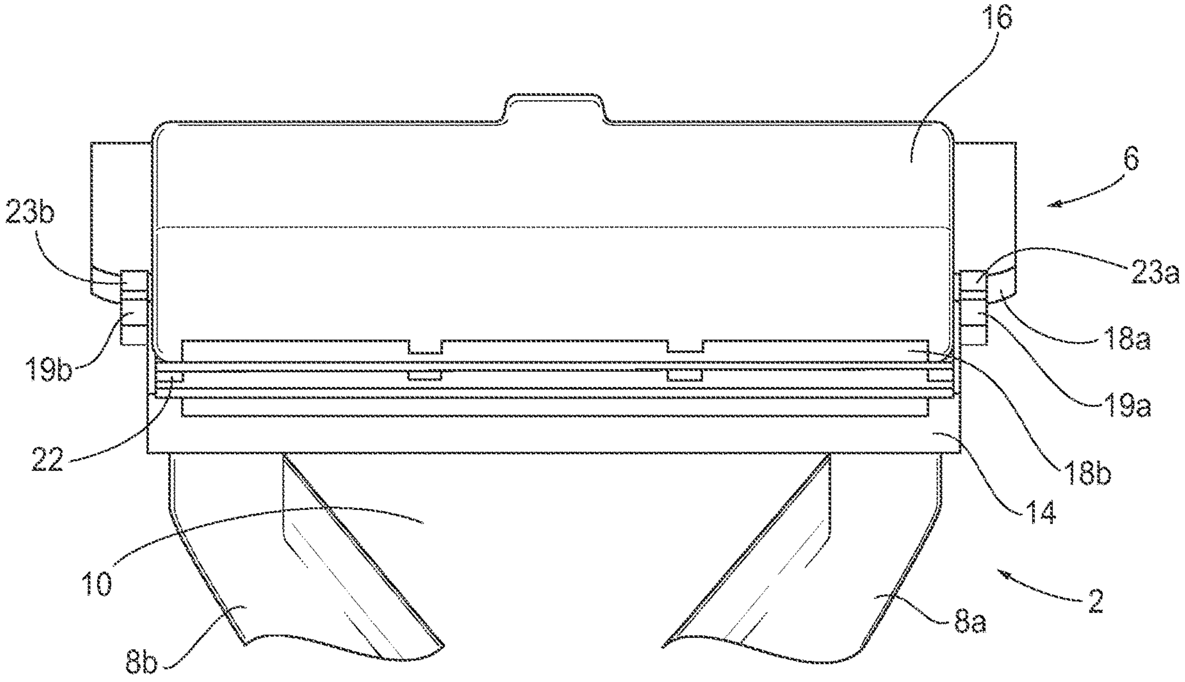

As shown in FIGS. 8 and 9, the separation member 22 also includes at least two stop members 23*a*, 23*b* to ensure that the top blade 18*b* is properly aligned on the separation member 22. The stop members 23*a*, 23*b* may extend from outer edges of the separation member 22. The stop members 23*a*, 23*b* may be configured to permit the blade 18*b* to rest on the stop members 23*a*, 23*b* so the blade 18*b* cannot slide in a downward direction out of the frame 14. The stop members 23*a*, 23*b* may be positioned upwardly from the stop members 19*a*, 19*b*. The stop members 23*a*, 23*b* may also assist in stopping the blade 18*b* from moving in a left-right lateral direction in the frame 14. The separation member 22 may also include a back edge 23*c* that assists in keeping the blade 18*b* from moving in an upward direction relative to the frame 14. Once the blade 18*b* has been positioned on the separation member 22, the blade 18*b* may abut the back edge 23*c*, thereby retaining the blade 18*b* in the head 2. Therefore, by retaining the blade 18*b* between the stop members 23*a*, 23*b* and the back edge 23*c*, the blade 18*b* may be properly aligned in the head 2.

With reference to FIGS. 1-5, a locking mechanism 24 for the razor 2 is described. After the blades 18*a*, 18*b* have been provided in the frame 14, as will be described in more detail hereinbelow, the cover 16 may be rotated and/or pivoted to the closed position to retain the blades 18*a*, 18*b* in the head 6. After the cover 16 has been moved to the closed position, the locking mechanism 24 may be used to lock and/or tighten the cover 16 to the frame 14 to hold the blades 18*a*, 18*b* therein. In one aspect, the locking mechanism 24 may include a thumbscrew 26, a shaft 28 extending from the thumbscrew 26, and a threaded portion 30 provided on one end of the shaft 28. The threaded portion 30 may be provided on one end of the shaft 28, while the thumbscrew 26 is provided on an opposing end of the shaft 28. The thumbscrew 26 may be positioned on a top surface of the frame 14. In one aspect, the top surface of the frame 14 is understood to be the surface of the frame 14 that is opposite the surface of the frame 14 that holds the blades 18*a*, 18*b*. The thumbscrew 26 may be rotated in one direction to tighten the cover 16 to the frame 14, and rotated in an opposite direction to loosen the cover 16 from the frame 14. The shaft 28 may extend from the thumbscrew 26 and through corresponding apertures defined in the frame 14, the separation member 22, and the cover 16. The threaded portion 30 may be threaded into a threaded aperture defined in the cover 16 to hold the thumbscrew 28 in place and assist in retaining the blades 18*a*, 18*b* in the head 6. As the thumbscrew 28 is tightened, the blades 18*a*, 18*b* are sandwiched in between the frame 14 and the cover 16 with the separation member 22 therebetween. In one aspect, the thumbscrew 28 may be captive or auto-retained in the head 6 so that the thumbscrew 28 cannot fall out of the head 6 even if the thumbscrew 28 is screwed the entire way out. It is also contemplated that alternative locking mechanisms may be used to retain the blades 18*a*, 18*b* in the head 6, including a snap-fit arrangement or a clamping mechanism, among other locking mechanisms that could hold the frame 14 and cover 16 together. In another aspect, a magnetic locking mechanism may be used with the razor 2 to hold the frame 14 and cover 16 to one another. The magnetic locking mechanism is described in greater detail hereinbelow with reference to the razor 100 of FIG. 11.

With reference to FIGS. 5-10, a method of using the razor 2 is described in detail. The razor 2 may be configured to allow replacement of the blades 18*a*, 18*b* after the blades 18*a*, 18*b* have become dull due to extended use of the razor 2. It is also contemplated that the blades 18*a*, 18*b* may be replaced at any desired time by the individual regardless of the wear on the blades 18*a*, 18*b*. FIGS. 4-9 illustrate a method of inserting the blades 18*a*, 18*b* into the head 6 for the first time or replacing the blades 18*a*, 18*b*. It is also to be understood that this same method may be used to replace old blades with new blades as well. In this method, the old blades must first be removed from the head 6 before the new blades 18*a*, 18*b* are inserted into the head 6.

As shown in FIG. 6, the cover 16 and separation member 22 of the head 6 may be positioned in the open position. The cover 16 and the separation member 22 may be rotated relative to the frame 14 to expose an inner portion of the head 6 in which the blades 18*a*, 18*b* will be inserted. In one aspect, the bottom blade seat 32 is exposed in the head 6. The bottom blade seat 32 may be provided on the frame 14 of the head 6. In a second step shown in FIG. 7, a first blade 18*a* may be positioned on the bottom blade seat 32. The razor edge of the first blade 18*a* may be positioned to extend from the cover 6 to provide a cutting surface for shaving an individual's face or other body part. In one aspect, the first blade 18*a* may be a "half blade" created from a full double-edged razor blade, as described above.

As shown in FIG. 8, after the first blade 18*a* has been positioned on the bottom blade seat 32, the separation member 22 may be rotated relative to the frame 14 to sit on or be positioned over the first blade 18*a*. After the separation member 22 has been rotated down to a position over the first blade 18*a*, a top blade seat 34 may be provided on a top surface of the separation member 22. The top blade seat 34 may be configured to receive the second blade 18*b*. As shown in FIG. 9, the second blade 18*b* may be positioned on the top blade seat 34. The razor edge of the second blade 18*b* may extend from the head 6 similar to the first blade 18*a* to provide a cutting surface for shaving an individual's face or body part. In one aspect, the second blade 18*b* may be the other "half blade" created from the full double-edged razor blade that also provided the first blade 18*a*.

As shown in FIG. 9, after the second blade 18*b* has been positioned on the top blade seat 34, the cover 16 may be rotated relative to the frame 14 to place the cover 16 in the closed position. In this closed position, the cover 16 may be positioned over the second blade 18*b* to enclose the blades 18*a*, 18*b* in the head 6. The thumbscrew 28 may then be rotated in a first direction to provide a clamping or "sandwiching" effect on the blades 18*a*, 18*b*. The threaded portion 30 of the locking mechanism 24 may rotate into the threaded aperture in the cover 16, thereby clamping or compressing all of the elements inside of the head 6. In one aspect, as the threaded portion 30 is inserted further into the threaded aperture of the cover 16, the tighter the blades 18*a*, 18*b* and separation member 22 are compressed together. As the blades 18*a*, 18*b* and the separation member 22 are tightened even further, a secure blade arrangement may be provided in the head 6 so that the blades 18*a*, 18*b* do not move within the head 6 during shaving.

In a similar manner, after the thumbscrew 28 has been tightened to a closed position and the cover 6 needs to be opened, the thumbscrew 28 may be rotated in an opposite direction to loosen the clamping force on the blades 18*a*, 18*b* and the separation member 22. As the thumbscrew 28 is rotated in the opposite direction, the threaded portion 30 may be withdrawn or removed from the threaded aperture in the cover 16, thereby loosening the clamping effect on the blades 18*a*, 18*b* and the separation member 22. After the thumbscrew 28 is rotated a sufficient amount, the threaded portion 30 is completely removed from the threaded aperture of the cover 16 allowing the cover 16 to once again rotate relative to the frame 14. Even though the threaded portion 30 may be completely removed from the cover 16, the thumbscrew may still be retained in the frame 14 so that the thumbscrew 28 does not fall out during operation of the razor 2. It is to be understood that once the blades 18*a*, 18*b* become dull or new blades are desired, this process may be reversed to open the cover 16 and replace the old blades 18*a*, 18*b*. It is also to be understood that this method may be used with just one razor blade that rests on either the bottom blade seat 32 or the top blade seat 34. It is further contemplated that more than one razor blade may be positioned on each of the bottom and top blade seats 32, 34. The number and position of the blades 18*a*, 18*b* may be provided in different configurations to adjust the aggressiveness of the razor 2. For example, for individuals with sensitive skin, a razor 2 with one blade 18*a* may be used to provide a gentler shave. In contrast, for individuals with thicker hair, the razor 2 may be provided with two blades 18*a*, 18*b* to provide a more aggressive shave. It is also contemplated that the position of the blades 18*a*, 18*b* in the head 6 may be altered so a gap between the blade edge and the bottom of the frame 14 may be altered, as well. This gap affects the aggressiveness of the shave against an individual's skin since it defines how much of the individual's skin is exposed to the blade edge. Therefore, if the individual moves a single blade 18*a* to an upper position in the razor head 6, the gap increases thereby exposing a larger area of the individual's skin to the razor edge between the razor edge and the lower edge of the frame 14. Likewise, an individual may place the single blade 18*a* at an intermediate position in the head 6 to provide a less aggressive shave.

One advantage of using the razor 2 is the reduced cost of the blades 18*a*, 18*b* as compared to typical disposable razors. The total cost of new double-edged razor blades is significantly less than the cost of cartridge razors or entire disposable razors. By using the razor 2 with the blades 18*a*, 18*b*, there is also less waste and no disposal of plastic from the razor 2 in the garbage. The geometry of the razor 2 and the ease of opening the cover 16 of the head 6 allow for easy and effective rinsing and cleaning of the razor 2. Any hair or debris clogged in the head 6 is easily removed and cleaned.

With reference to FIGS. 11-27, another aspect of a shaving razor 100 is described. The razor 100 may include a handle 102 and a head 104. In one aspect, the head 104 may be pivotable or rotatable relative to or about the handle 102, as described hereinbelow. The head 104 may have a substantially rectangular shape. In one aspect, the handle 102 may have a substantially triangular cross-sectional shape. However, it is also contemplated that alternative shapes may be used, such as circular, oval, square, or trapezoidal. The handle 102 may include a first extension member 106*a* and a second extension member 106*b*. The first and second extension members 106*a*, 106*b* may extend from a distal end of the handle 102. The distal end of the handle 102 may be understood to be the end of the handle 102 that is not held by a user during use of the razor 100. The first and second extension members 106*a*, 106*b* may define an aperture 108 therebetween. It is also contemplated that the aperture 108 may not be defined by the first and second extension members 106*a*, 106*b* and, instead, the handle 102 may be formed as a single, monolithic structure. The handle 102 may include a plurality of grooves 110 on an outer surface of the handle 102. The grooves 110 are configured to assist a user in holding the razor 100 so as not to drop or fumble the razor 100 during use. In one aspect, the grooves 110 may be square or rectangular in shape. It is also contemplated that additional or alternative shapes may be used for the grooves 110. It is also contemplated that the grooves 110 may be replaced or used with protrusions or bumps (not shown) on the handle 102. The handle 2 may also include different textured surfaces, as well, such as a knurled surface or a rubber coating to provide a better grip for the individual using the razor 2.

Figure 11:
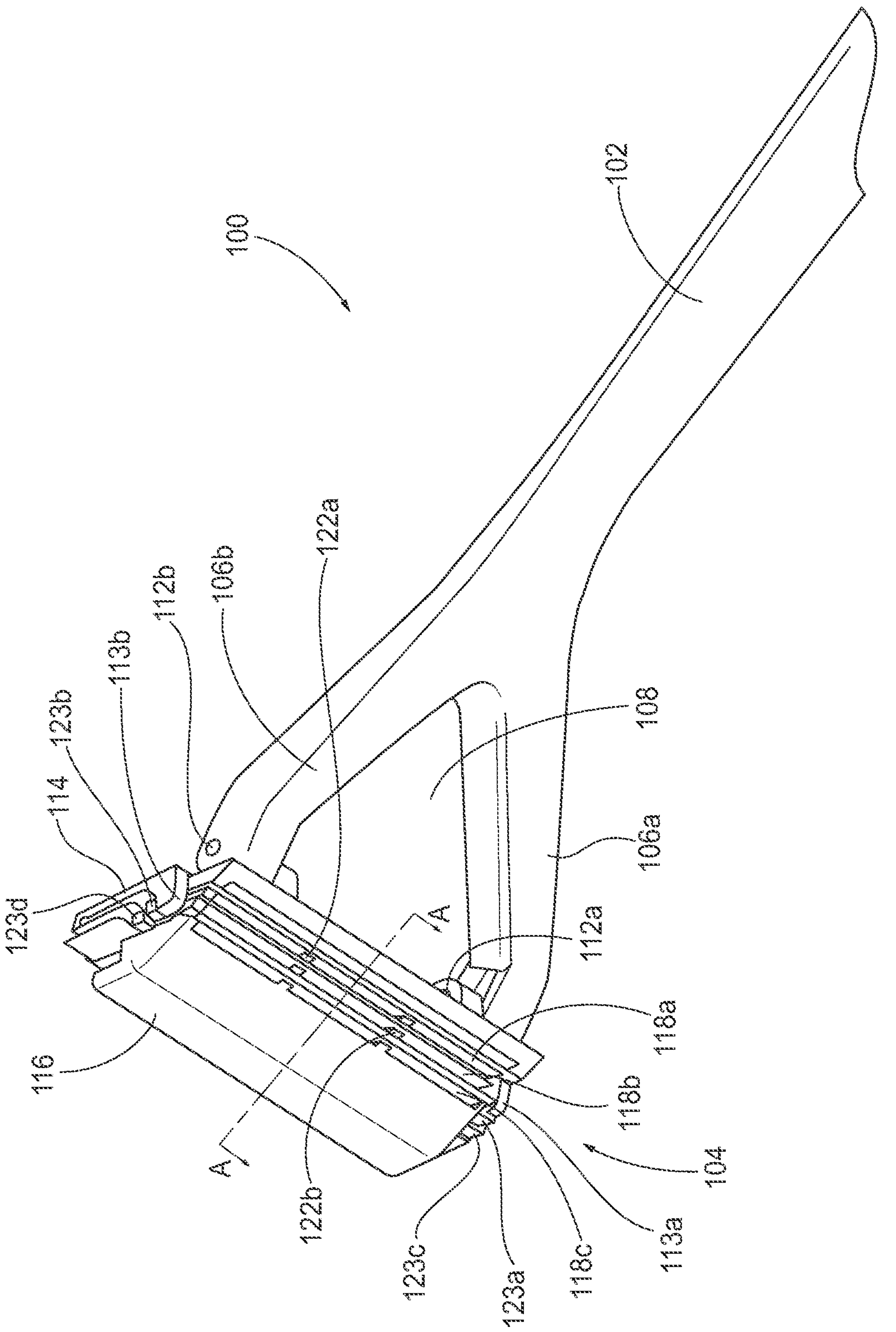
FIGS. 11 and 12 are bottom perspective views of a razor in accordance with another aspect of the present disclosure.
Figure 12:
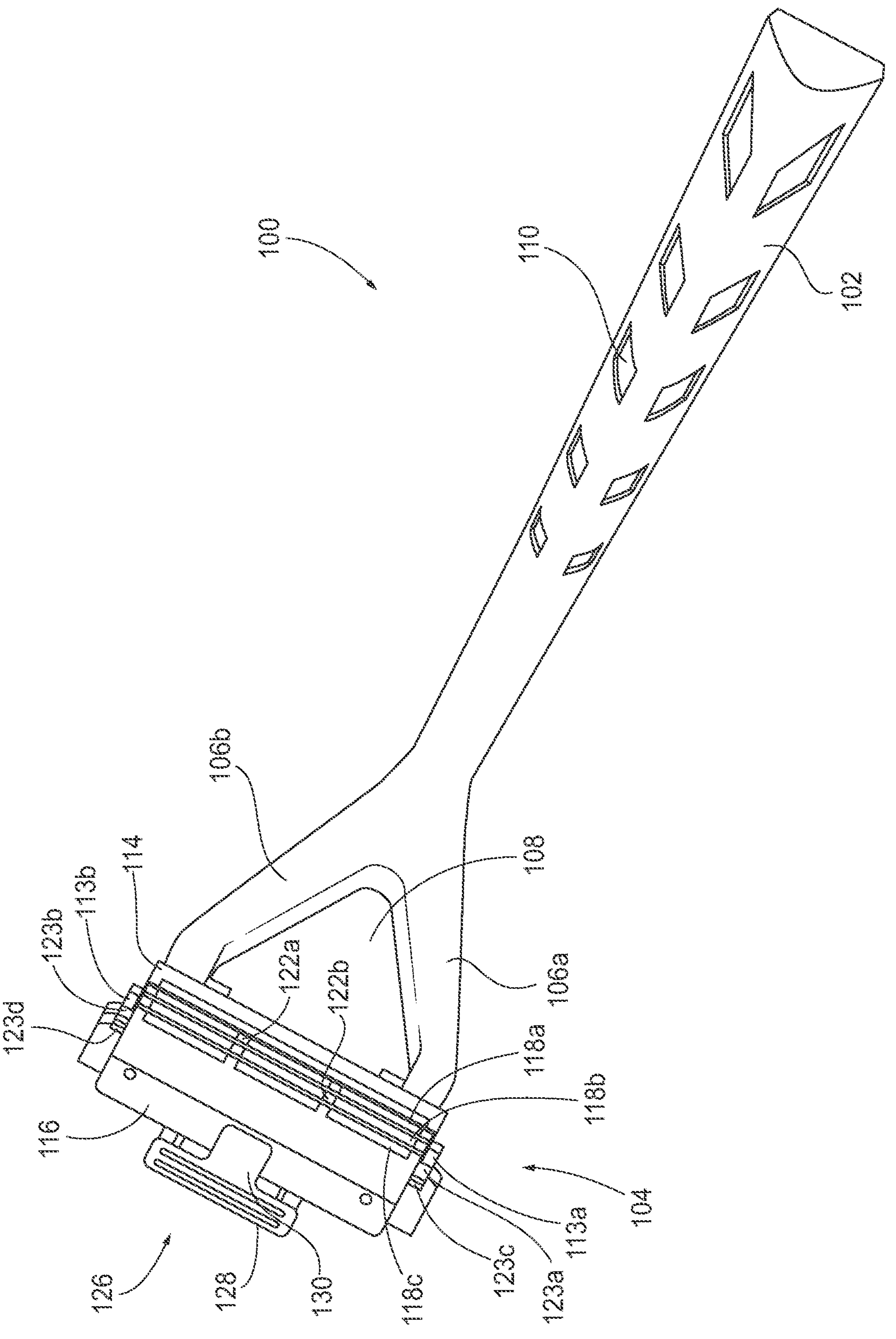
Figure 13:
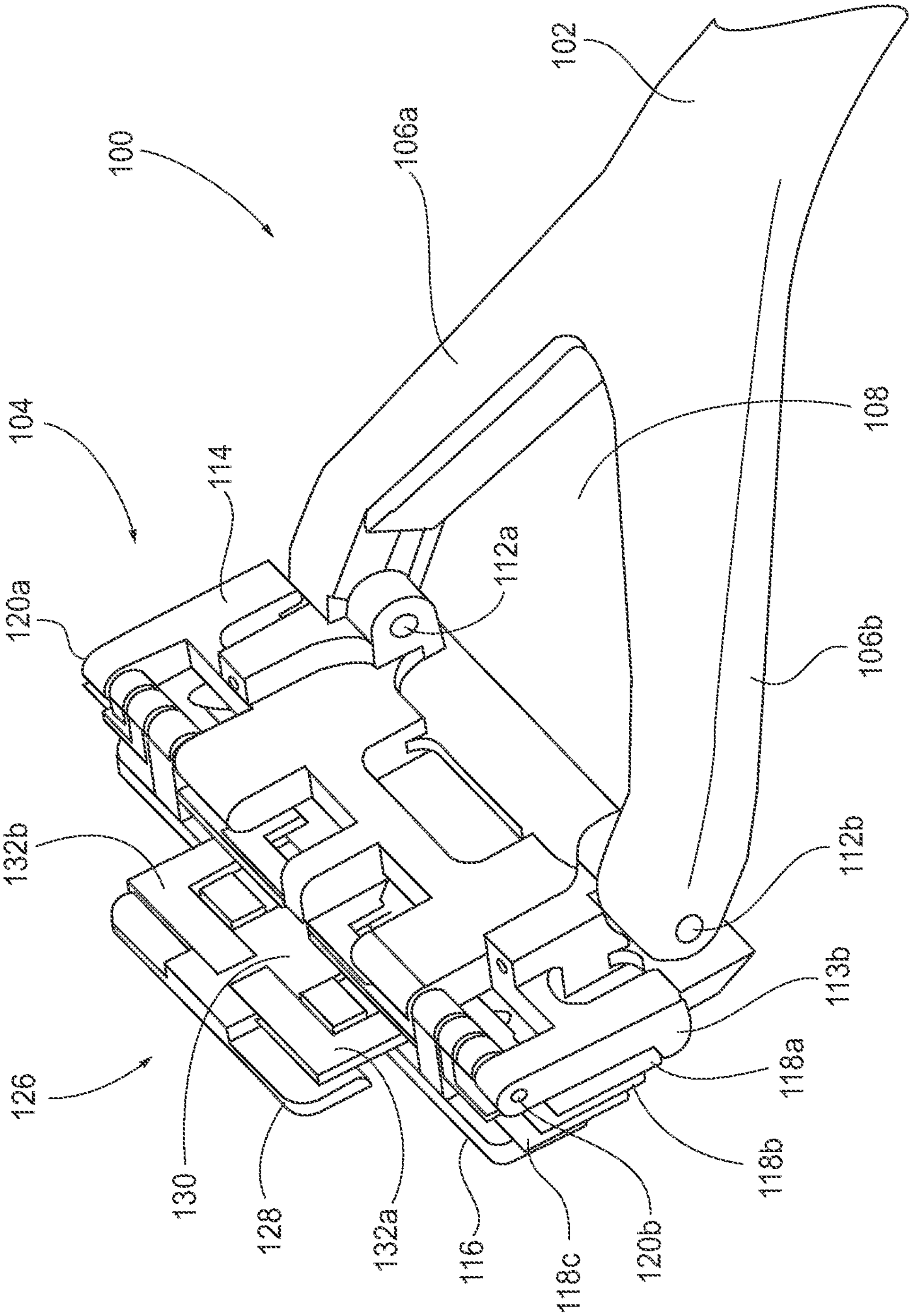
FIG. 13 is a top perspective view of a head of the razor of FIG. 11.
Figure 14:
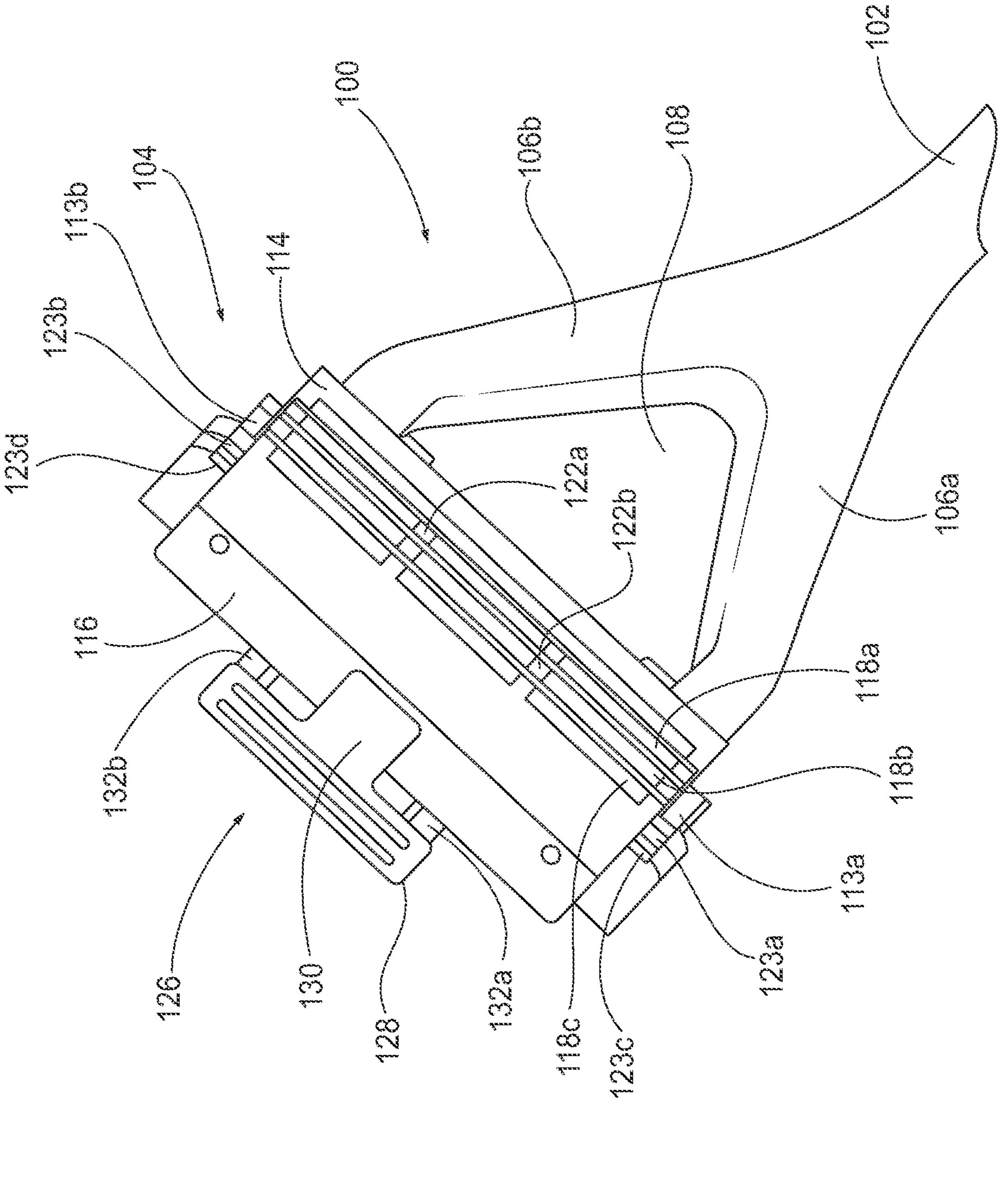
FIG. 14 is a bottom perspective view of the head of the razor of FIG. 11.
Figure 15:
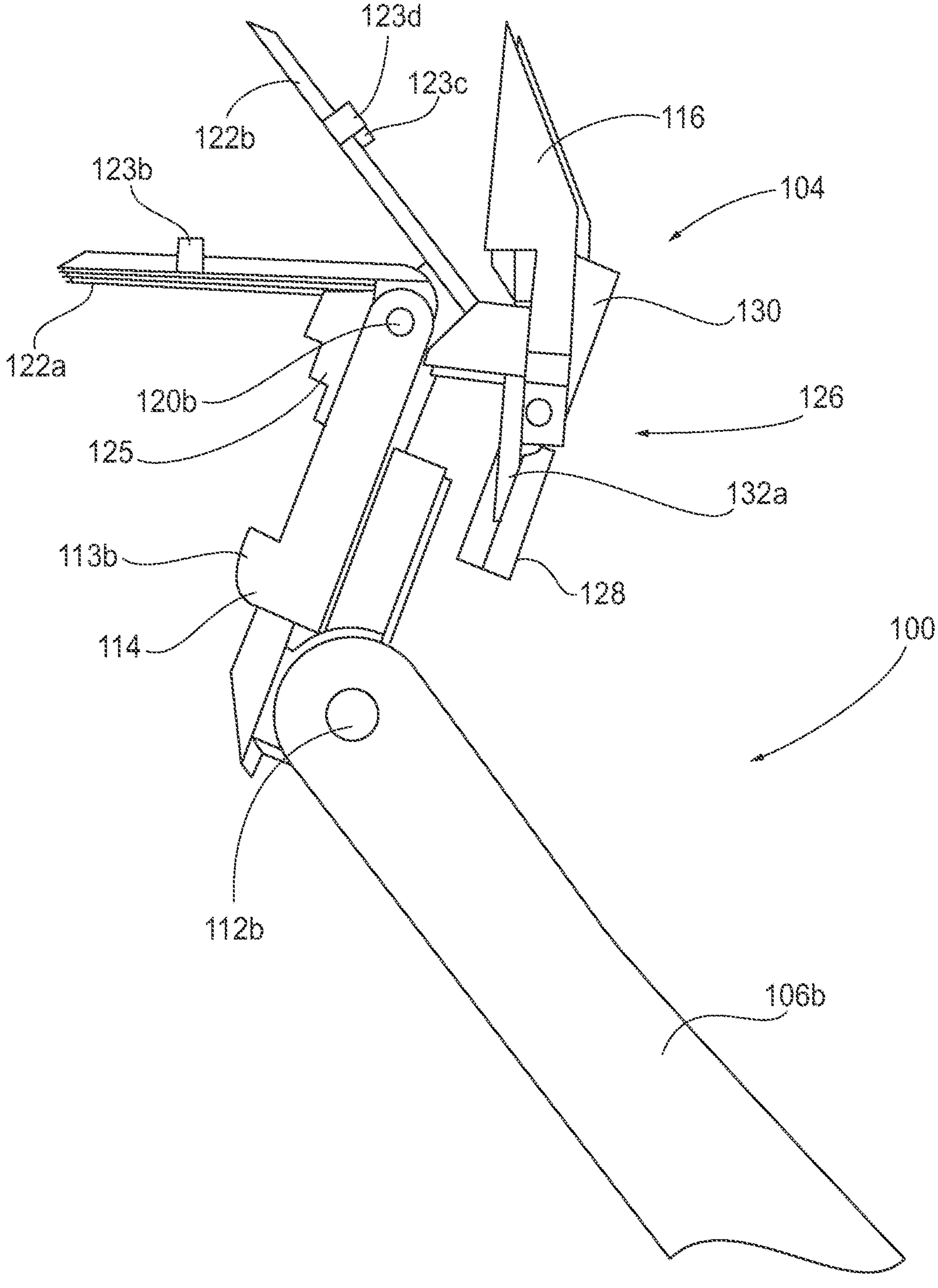
FIG. 15 is a side view of the head of the razor of FIG. 11.
Figure 16:
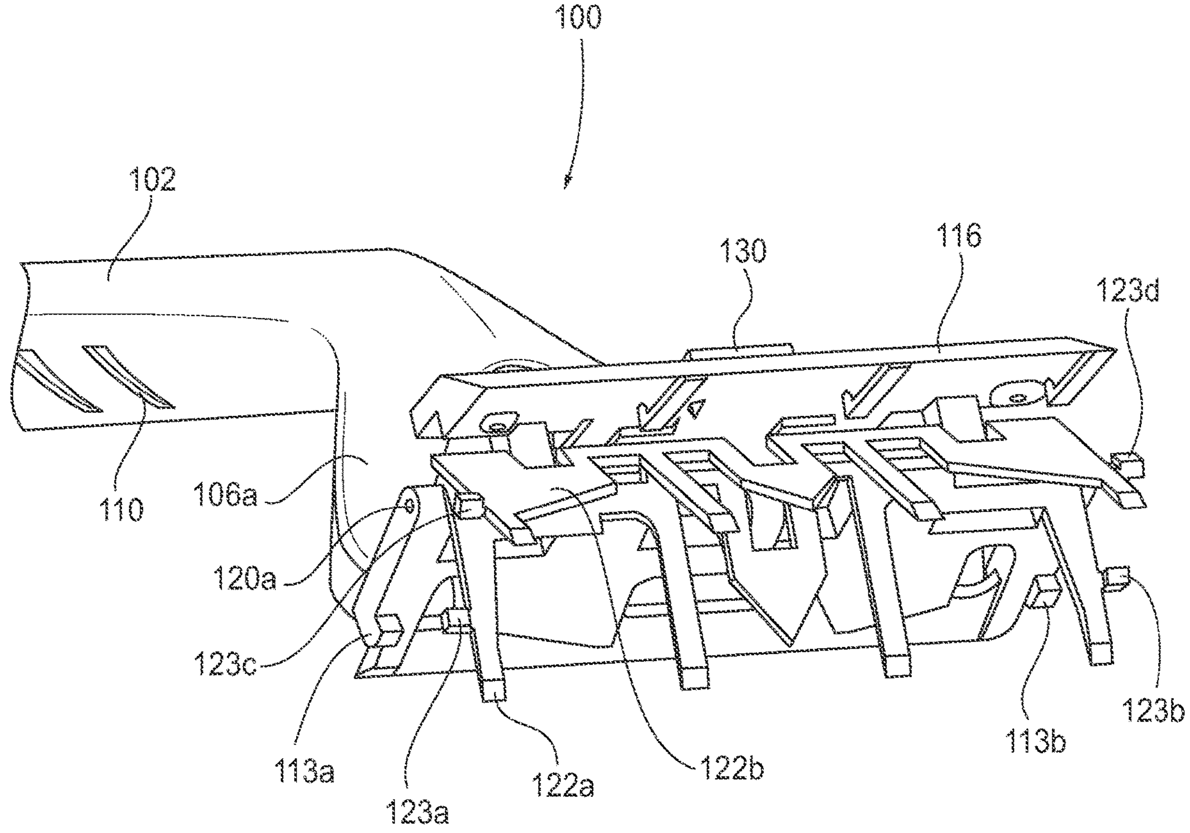
FIG. 16 is a front perspective view of the head of the razor of FIG. 11.

With reference to FIGS. 11, 13, and 15, the head 104 may be positioned on the distal ends of the first and second extension members 106*a*, 106*b*. In one aspect, the head 104 may be rotatably attached to the first and second extension members 106*a*, 106*b* by pins 112*a*, 112*b*. The pins 112*a*, 112*b* may be provided in apertures defined in the distal ends of the first and second extension members 106*a*, 106*b* and may allow the head 104 to freely rotate and/or pivot about the handle 102. In one aspect, separate pins 112*a*, 112*b* may be inserted through each respective extension member 106*a*, 106*b*. In another aspect, one pin may be inserted through both extension members 106*a*, 106*b*. By permitting rotation or pivoting of the head 104 relative to the handle 102, the razor 100 may be configured to set the blade and/or blades at a correct angle when pressure is applied to an individual's face or body. It is also contemplated that the head 104 may be spring-loaded on the handle 102 so the head 104 is returned to a resting position after being rotated relative to the handle 102.

With reference to FIGS. 11-16, the head 104 may include a frame 114 and a cover 116. The frame 114 may be attached to the first and second extension members 106*a*, 106*b* via the pins 112*a*, 112*b*. By connecting the frame 114 to the extension members 106*a*, 106*b* via the pins 112*a*, 112*b*, the frame 114 may also be rotated and/or pivoted about the handle 102. The frame 114 and cover 116 may be configured to hold together at least three blades 118*a*, 118*b*, 118*c* in the head 104. It is also contemplated that the frame 114 and cover 116 may hold one blade, two blades, or more than three blades in the head 104. In one aspect, the blades 118*a*, 118*b*, 118*c* may be formed from a double-edged razor blade. Typically, double-edged razor blades include two opposing razor edges connected by a weak or thin body member. The blades are typically designed so that an individual can break each double-edged razor blade in half by hand. By breaking the double-edged razor blades in half, two "half blades" or two halves of the double-edged razor blade are provided. Each half may include one razor edge. It is also to be understood that the "half blades" may be provided in this initial form, without the need for breaking a double-edged razor blade in half. By using the "half blades" in the head 104, the razor 100 may provide a multi-razor blade configuration for shaving an individual's face. While it is contemplated that any type of double-edged razor blade may be used with the razor 100, it is also contemplated that specific "half blades" may be designed and configured to custom fit in the frame 114 and cover 116 of the head 104. As shown in FIGS. 24-27, the blades 118*a*, 118*b*, 118*c* may be arranged in a stepped arrangement within the head 104.

As shown in FIGS. 13 and 15, the frame 114 may be rotatably connected to the cover 116 via pins 120*a*, 120*b*. In this configuration, the cover 116 may be rotatable and/or pivotable about the pins 120*a*, 120*b* and thereby the frame 114. It is also contemplated that a single pin may be used to rotatably connect the frame 114 to the cover 116. In this aspect, the cover 116 may not be removable from the head 104 so that the cover 116 is not lost or damaged. It is also contemplated, however, that the cover 116 may be fully removable from the head 104. The cover 116 may be configured in at least two positions, including an open position and a closed position. In the open position, the cover 116 may be rotated relative to the frame 114 to allow for the removal and replacement of the blades 118*a*, 118*b*, 118*c* in the head 104. In the closed position, the cover 116 may be positioned on top of the frame 114 to retain the blades 118*a*, 118*b*, 118*c* in the head 104.

Figure 30:
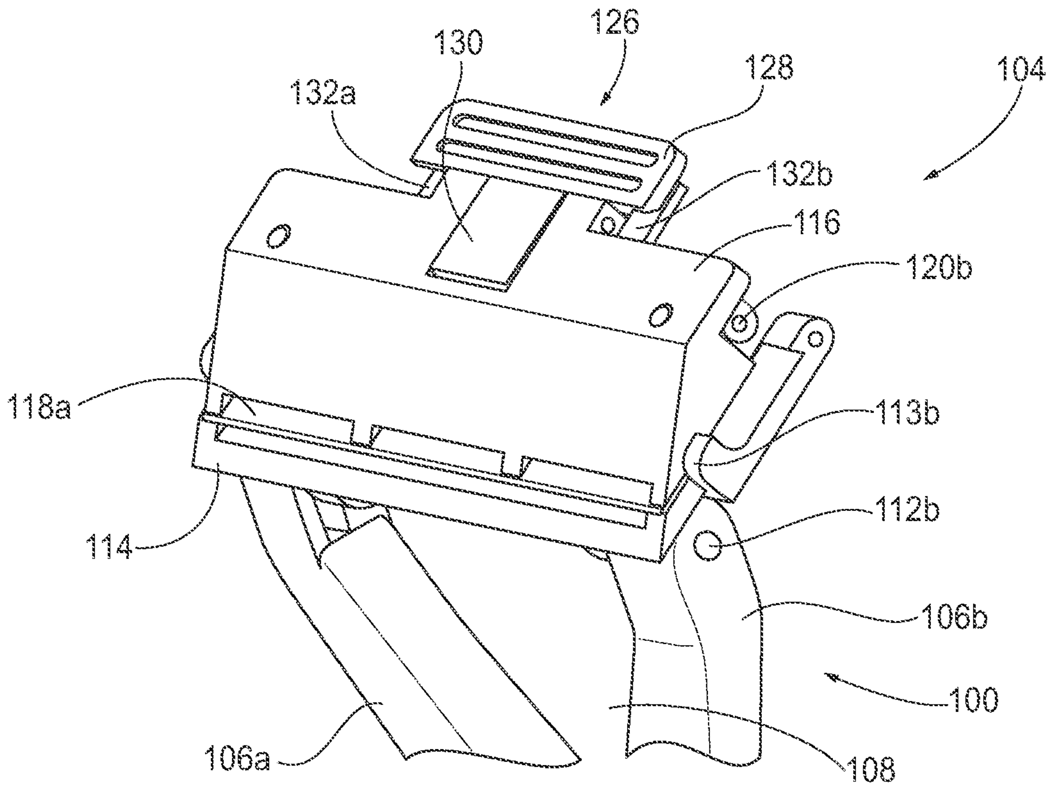
FIG. 30 is a front perspective view of the head of the razor of FIG. 11 including one razor blade therein.

At least two separation members 122*a*, 122*b* may also be provided in the head 104. The separation members 122*a*, 122*b* may be configured to separate the blades 118*a*, 118*b*, 118*c* from each other in the head 104. In one aspect, the separation members 122*a*, 122*b* may be positioned between the blades 118*a*, 118*b*, 118*c* when the blades 118*a*, 118*b*, 118*c* are retained in the head 104. One separation member 122*a* may be positioned between two blades 118*a*, 118*b*, and another separation member 122*b* may be positioned between two blades 118*b*, 118*c*. The separation members 122*a*, 122*b* may be rotatably attached to the corresponding pins 120*a*, 120*b*, respectively, and positioned within and between the frame 114 and cover 116. The separation members 122*a*, 122*b* may be rotatable and/or pivotable relative to the frame 114 and cover 116. As shown in FIG. 30, it is also contemplated that the razor 100 may include one blade 118*a* positioned between the frame 114 and the cover 116. In this aspect, the cover 116 may be rotatably connected to the frame 114. The blade 118*a* may be configured to rest on a stop member 113*a*, which is described in greater detail hereinbelow.

Figure 17:
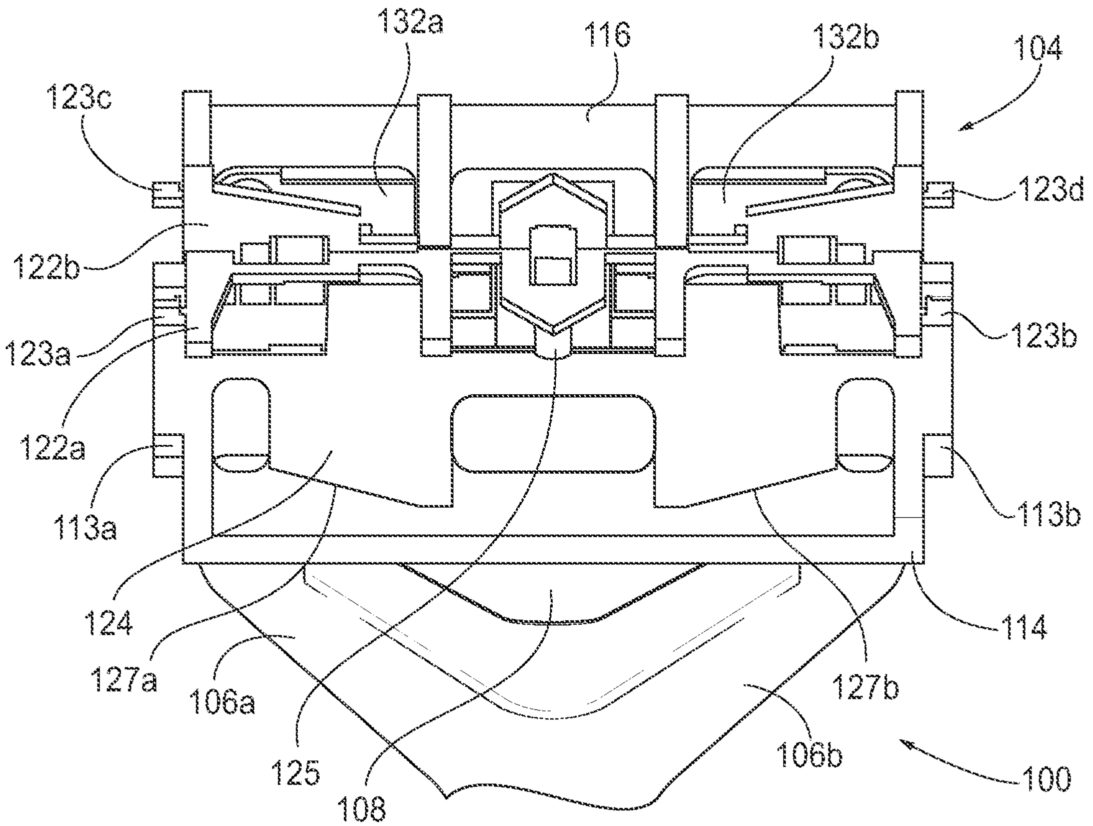
FIGS. 17-23 are bottom views of the head of the razor of FIG. 11 illustrating a method of replacing razor blades in the razor.
Figure 18:
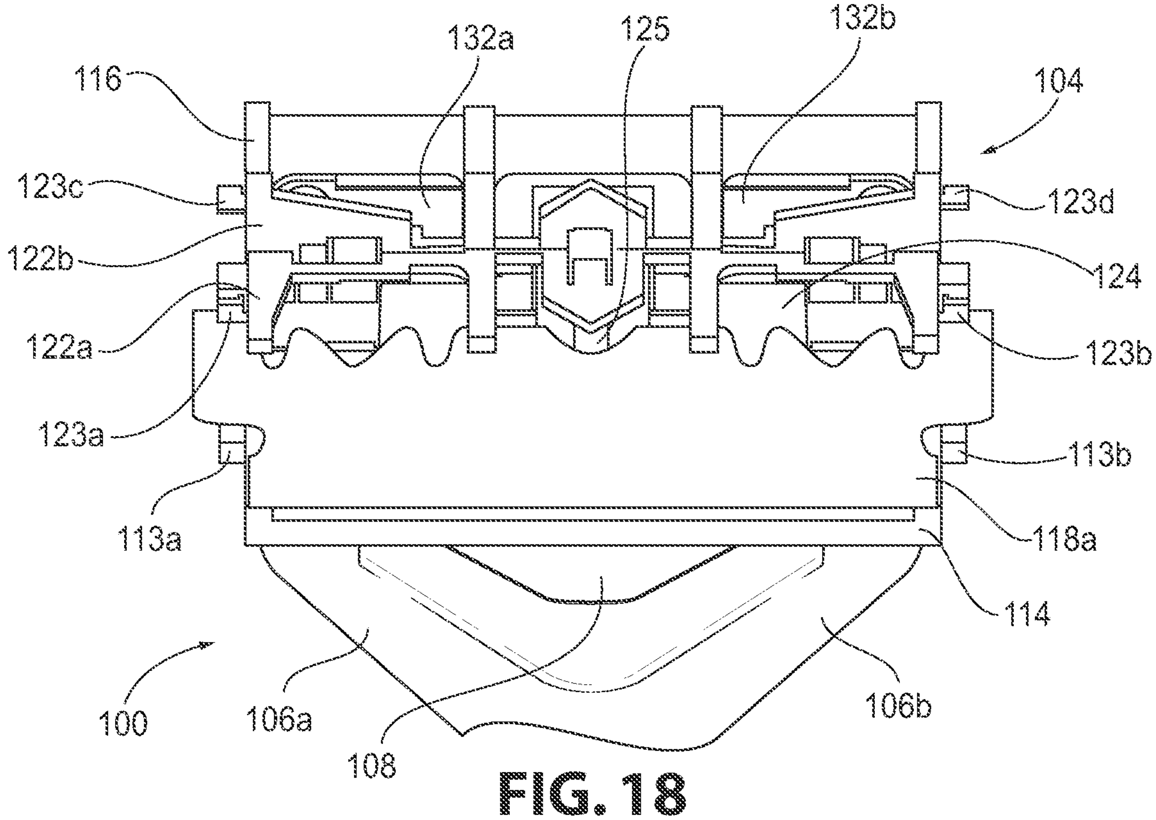
Figure 19:
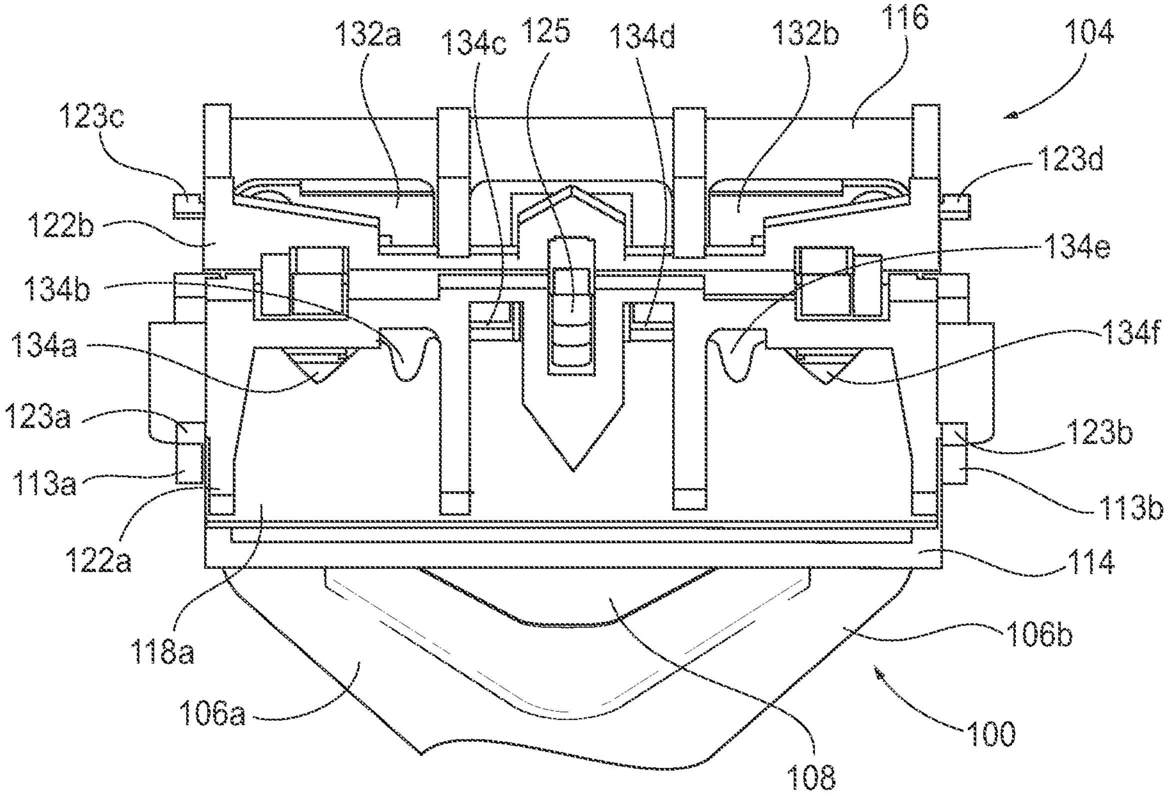
Figure 21:
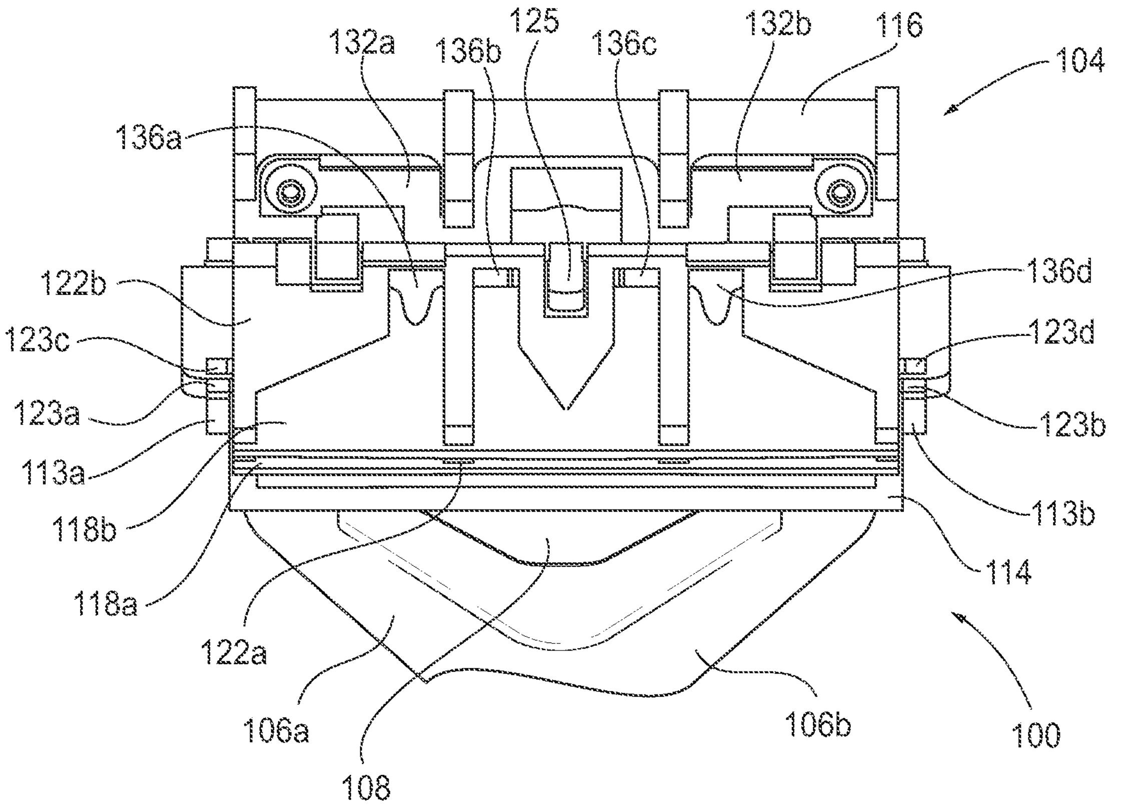

The separation members 122*a*, 122*b* of this aspect of the razor 100 may utilize minimal material as compared to the separation member 22 of the razor 2 shown in FIGS. 1-10, so as to assist in the cleaning and maintenance of the razor 100. It is also contemplated that additional extension members or portions may be provided with the separation members 122*a*, 122*b* to provide additional support for the blades 118*a*, 118*b*. The additional extension members include portions that extend from the separation members 122*a*, 122*b* or additional material used on the body of the separation members 122*a*, 122*b*. Instead of the separation members 122*a*, 122*b* substantially covering the blades 118*a*, 118*b*, 118*c* as with the separation member 22 of the razor 2 shown in FIGS. 1-10, the separation members 122*a*, 122*b* define several openings or spaces to allow water to flow through the head 104 of the razor 100. As shown in FIG. 19, water may flow through and rinse the separation member 122*a* and the blade 118*a* through fluid openings 134*a-f* defined between the separation member 122*a* and the blade 118*a*. Similarly, as shown in FIG. 21, water may also flow through and rinse the other separation member 122*b* and another blade 118*b* through fluid openings 136*a-d* defined between the separation member 122*b* and the blade 118*b*. As shown in FIG. 17, a bottom blade seat 124 may protrude or extend from a top surface of the frame 114. The bottom blade seat 124 may be an integral extension of the frame 14 so that the bottom blade seat 124 is rotatable about the handle 102. It is also contemplated that the bottom blade seat 124 is a separate member that is rotatably connected to the handle 102 via the pins 120*a*, 120*b*. The bottom blade seat 124 may also define at least two angled edges 127*a*, 127*b* that assist in directing the water flow through head 104 of the razor 100 during washing of the razor 100.

Similar to the frame 14 in FIGS. 1-10, the frame 114 may include stop members 113*a*, 113*b* to assist in retaining the blade 118*a* in the head 2. Similarly, the separation member 122*a* may include stop members 123*a*, 123*b* to assist in retaining the blade 118*b* in the head 2. The separation member 122*b* may include stop members 123*c*, 123*d* to assist in retaining the blade 118*c* in the head 2. The stop members 123*a*-123*d* of the separation members 122*a*, 122*b* may be positioned above the stop members 113*a*, 113*b* of the frame 114 so, as the blades 118*a*-118*c* sit on the stop members 113*a*, 113*b*, 123*a*-123*d*, the blades 118*a*-118*c* may be arranged in a staggered, stepped arrangement.

As shown in FIGS. 15 and 24-27, the frame 114 may also include a stepped locking abutment 125 that the blades 118*a*-118*c* may abut when inserted into the head 104 of the razor 100. The locking abutment 125 may be configured to stop the blades 118*a*-118*c* from moving in an upward direction relative to the frame 114. The locking abutment 125 may include at least three steps corresponding to the blades 118*a*-118*c* in the head 104. It is contemplated that the locking abutment 125 may include an equal number of steps as blades in the head 104. As shown in FIGS. 24-27, a portion of each blade 118*a*-118*c* may rest on a corresponding step of the locking abutment 125.

Figure 24:
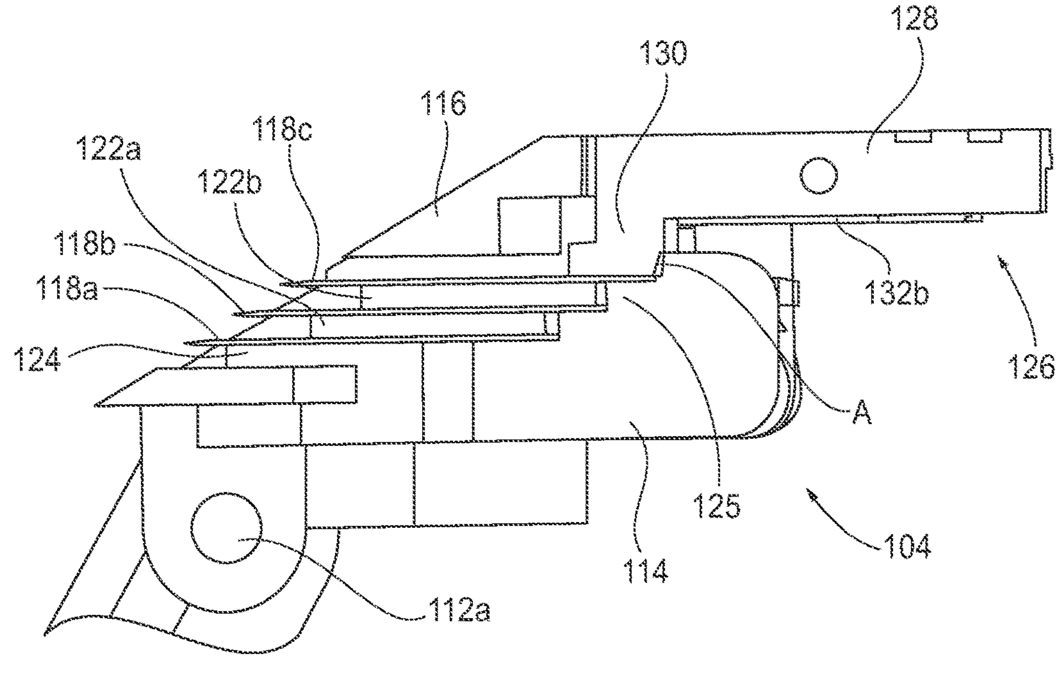
FIGS. 24-27 are cross-sectional views of the head of the razor of FIG. 11 along line A-A illustrating a method of actuating a locking mechanism on the razor.
Figure 25:
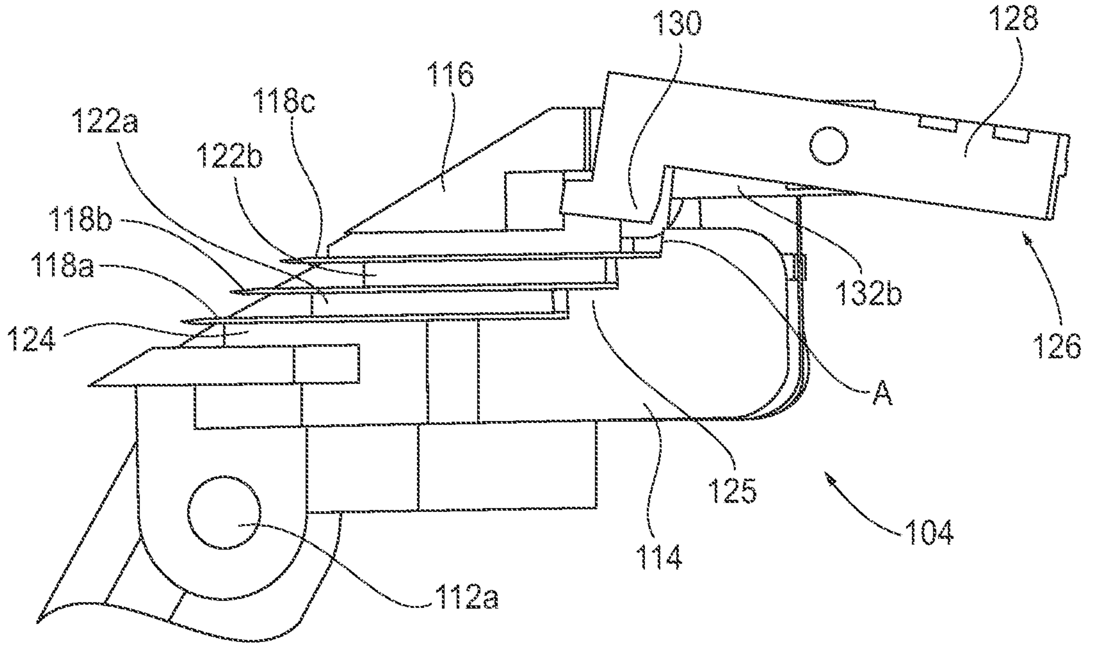
Figure 26:
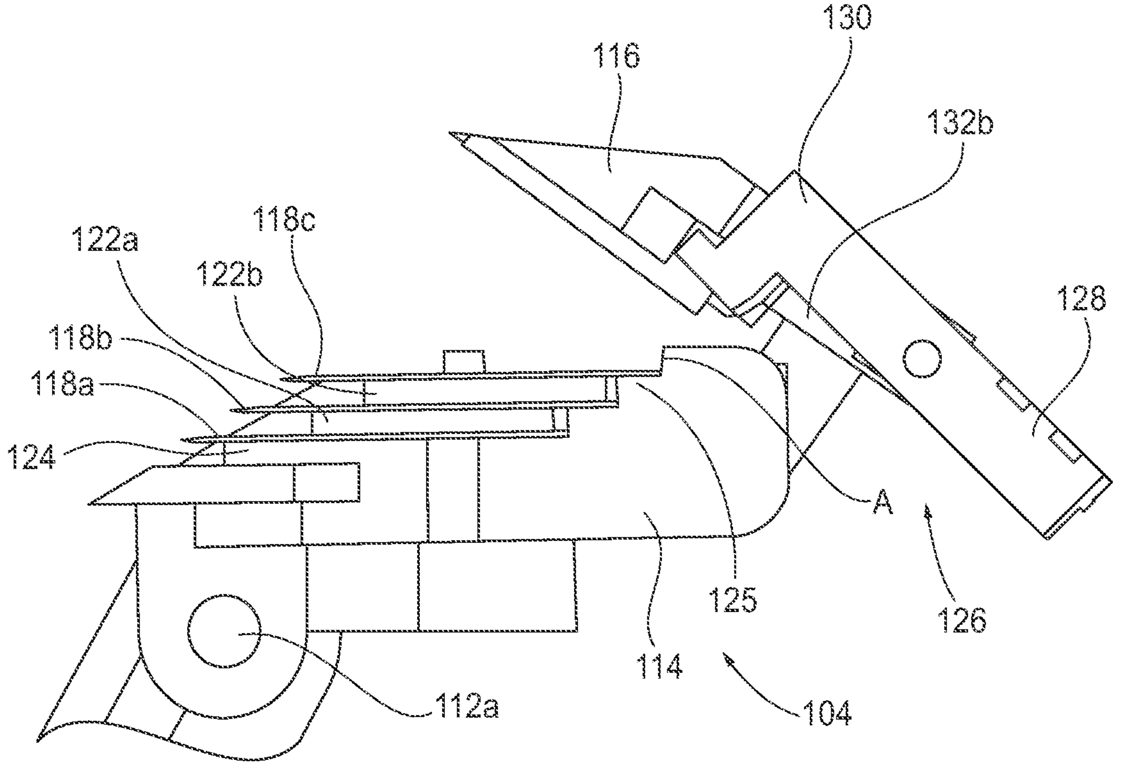
Figure 27:
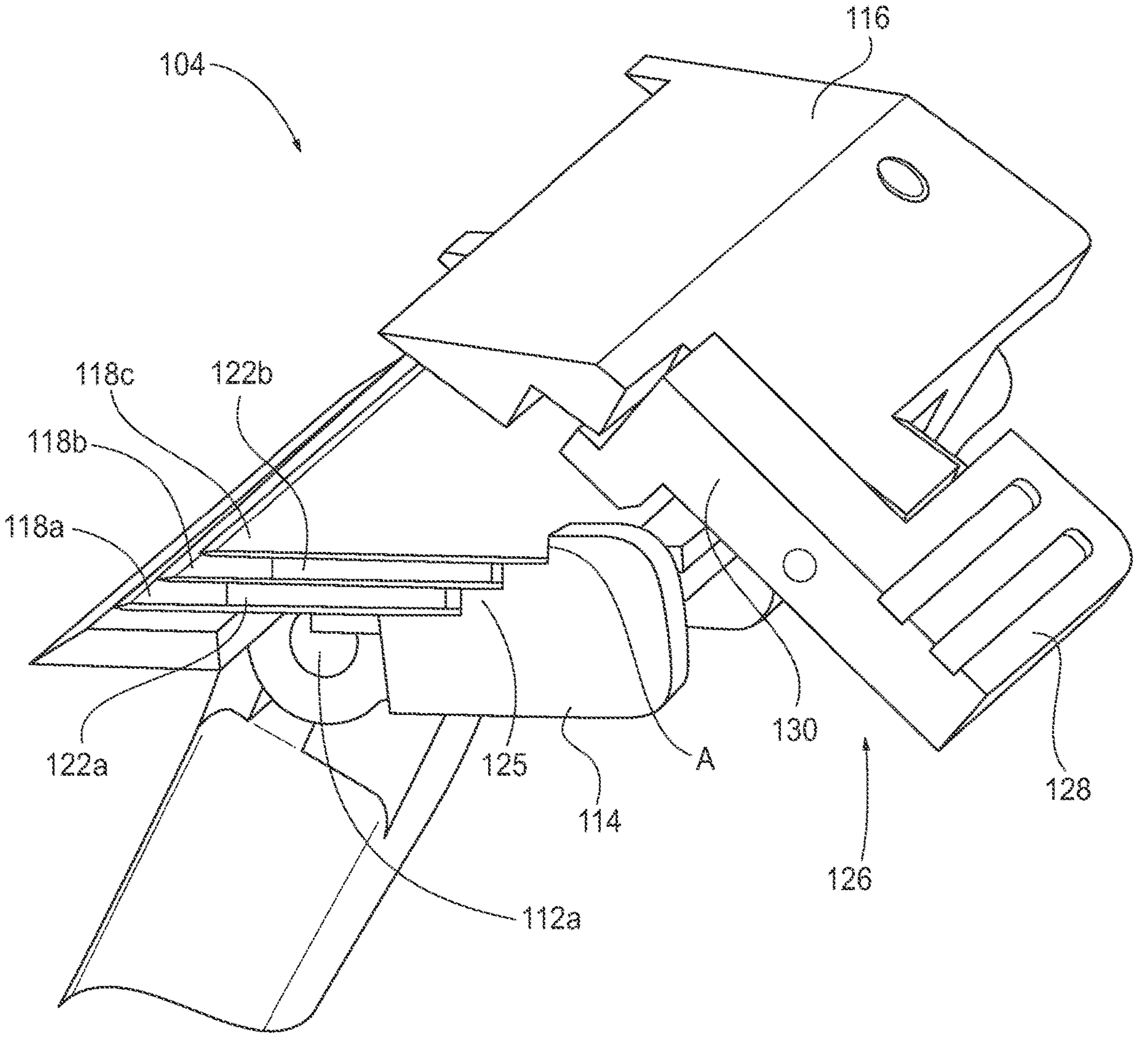

With reference to FIGS. 12-15 and 24-27, a locking mechanism 126 for the razor 100 is described. After the blades 118*a*, 118*b*, 118*c* have been provided in the frame 114, as will be described in more detail hereinbelow, the cover 116 may be rotated and/or pivoted to the closed position to retain the blades 118*a*, 118*b*, 118*c* in the head 104. After the cover 116 has been moved to the closed position, the locking mechanism 126 may be used to lock and/or tighten the cover 116 to the frame 114 to hold the blades 118*a*, 118*b*, 118*c* therein. In one aspect, the locking mechanism 126 may include a release lever 128, a retaining member 130 extending from the release lever 128, and at least two spring members 132*a*, 132*b* provided on the retaining member 130. The release lever 128 may be rotatable and/or pivotable about the cover 116. The release lever 128 may be actuated by an individual to rotate the release lever 128 relative to the cover 116. As shown in FIG. 24, in a closed or locked positioned, the release lever 128 holds the retaining member 130 against the cover 116. In one aspect, the release lever 128 may hold the retaining member 130 against a portion of the frame 114 at point A (FIGS. 24-27) to effect a clamping effect on the frame 114 via the cover 116. The portion of the frame 114 located at point A includes an inclined surface that assists in keeping the retaining member 130 in a locked position, thereby keeping the cover 116 in a locked position. When in the closed or locked position, the locking mechanism 126 prevents the cover 116 from rotating relative to the frame 114. Upon the blades 118*a*, 118*b*, 118*c* becoming dull or needing replacement, the locking mechanism 126 may be actuated to allow the cover 116 to rotate relative to the frame 114, thereby exposing the blades 118*a*, 118*b*, 118*c* in the head 104. As shown in FIG. 25, to actuate the locking mechanism 126 an individual may press downwards on the release lever 128 to release the retaining member 130 from a resting position. The retaining member 130 is rotated relative to the frame 114 to release the holding force on the cover 116, thereby allowing the cover 116 to rotate. As shown in FIGS. 26 and 27, the cover 116 may be opened to allow the individual to remove the dull blades 118*a*, 118*b*, 118*c* and replace them with new blades, as will be described in further detail below. As the release lever 128 is pushed downwards, a biasing force is created by the spring members 132*a*, 132*b*. In one aspect, the spring members 132*a*, 132*b* may be leaf springs. As the cover 116 is rotated further from the frame 114, the spring members 132*a*, 132*b* create a larger biasing force. In one aspect, the biasing force is configured to restore the locking mechanism 126 to a resting position after the individual releases pressure on the release lever 128. In one aspect, this resting position may correspond to the locking position of the locking mechanism 126. It is also contemplated that alternative locking mechanisms may be used to retain the blades 118*a*, 118*b*, 118*c* in the head 104, including a snap-fit arrangement or a clamping mechanism, among other locking mechanisms that could hold the frame 114 and cover 116 together.

Figure 28:
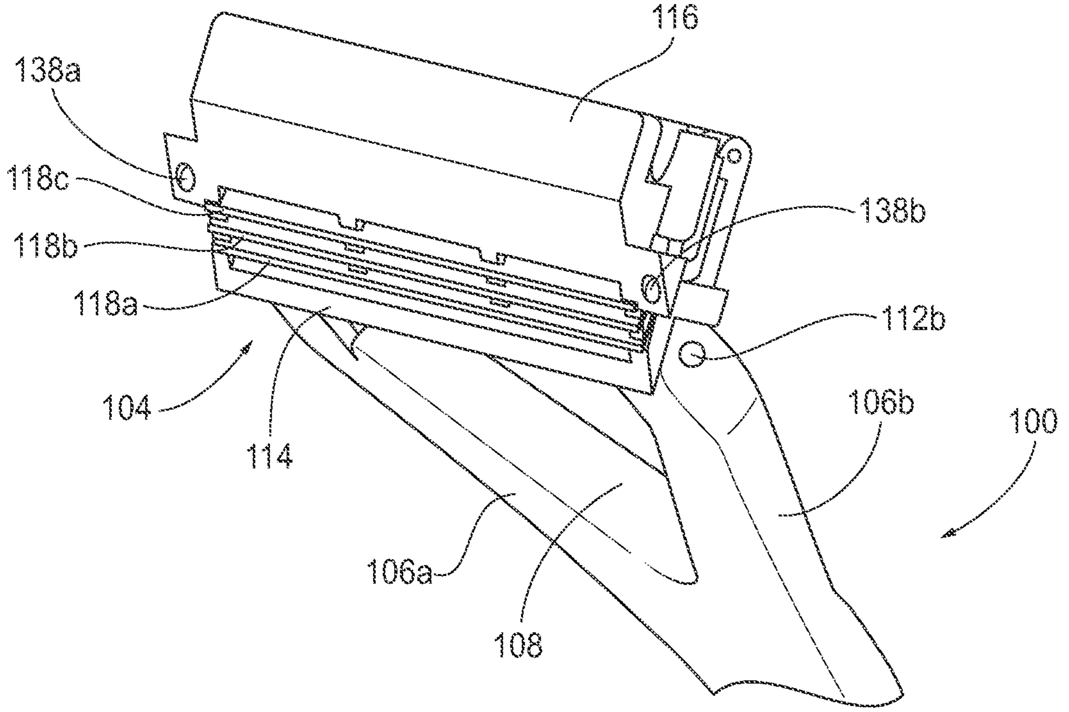
FIGS. 28 and 29 are front perspective views of the head of the razor of FIG. 11 including a magnetic locking mechanism.
Figure 29:
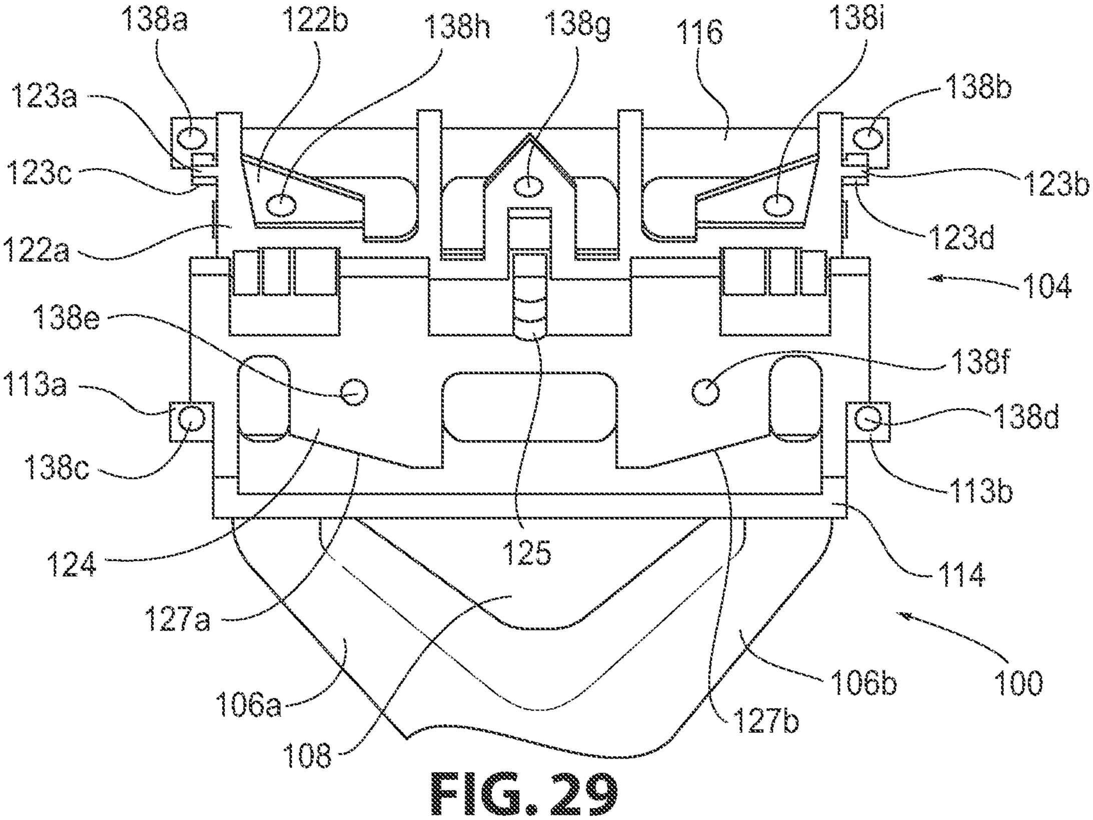

As shown in FIGS. 28 and 29, it is also contemplated that a magnetic locking mechanism may also be used with the razor 100 to create a clamping effect between the frame 114 and the cover 116. The magnetic locking mechanism may include at least one magnet 138*c*, 138*d* provided on or in the frame 114 and a corresponding at least one magnet 138*a*, 138*b* provided on or in the cover 116. By creating a magnetic force between the magnets 138*a-d*, the frame 114 and cover 116 may be clamped together. The cover 116 may be opened by applying a sufficient force to overcome the magnetic connection between the magnets 138*a-d*, thereby exposing the blades 118*a*, 118*b*, 118*c* in the head 104 and allowing an individual to replace the blades 118*a*, 118*b*, 118*c* in the razor 100, as will be described hereinbelow. It is also contemplated that the bottom blade seat 124 may include at least one magnet 138*e*, 138*f* to assist in the placement of the bottom blade 118*a* in the razor 100. The blade 118*a* may be slightly magnetic so the blade 118*a* may be magnetically connected to the bottom blade seat 124 but may also slide within the frame 114 until the blade 118*a* is properly positioned. The magnetic bottom blade seat 124 may assist in retaining the blade 118*a* against the frame 114 until the blade 118*a* is properly positioned. It is also contemplated that magnets 138*g-i* may be provided on the separation members 122*a*, 122*b* to assist in clamping the frame 114 to the cover 116, and to assist in retaining the blades 118*a*, 118*b*, 118*c*, which may be slightly magnetic, against the separation members 122*a*, 122*b*. It is to be understood that any number of magnets may be used with the razor 100 to effect a desired clamping force on the head 104. It is also to be understood that the magnets may also be used with the razor 2 shown in FIG. 1. In one aspect, the magnets 138*a-i* may be cylindrical in shape to fit within cylindrical recesses in the head 104. However, the magnets 138*a-i* may be of any size or shape. It is also contemplated that the magnets 138*a-i* may be positioned at different locations on the frame 114, cover 116, bottom blade seat 124, and separation members 122*a*, 122*b*. The blades 118*a-c* may be made from a stainless steel type of material. In one aspect, the blades 118*a-c* may be inherently magnetic and used to clamp the blades 118*a-c* to the frame 114, separation members 122*a*, 122*b*, and the cover 116 (which may be made of a magnetic stainless steel type of material), thereby eliminating the need to place magnets on the frame 114 or cover 116.

With reference to FIGS. 17-23, a method of using the razor 100 is described in detail. The razor 100 may be configured to allow replacement of the blades 118*a*, 118*b*, 118*c* after the blades 118*a*, 118*b*, 118*c* have become dull due to extended use of the razor 100. It is also contemplated that the blades 118*a*, 118*b*, 118*c* may be replaced at any desired time by the individual regardless of the wear on the blades 118*a*, 118*b*, 118*c*. FIGS. 17-23 illustrate a method of inserting the blades 118*a*, 118*b*, 118*c* into the head 104 for the first time or replacing the blades 118*a*, 118*b*, 118*c*. It is also to be understood that this same method may be used to replace old blades with new blades, as well. In this method, the old blades must first be removed from the head 104 before the new blades 118*a*, 118*b*, 118*c* are inserted into the head 104.

As shown in FIG. 17, the cover 116 and a separation member 122*a* of the head 104 may be positioned in the open position. The cover 116 and the separation member 122*a* may be rotated relative to the frame 114 to expose an inner portion of the head 104 in which the blades 118*a*, 118*b*, 118*c* will be inserted. In one aspect, the bottom blade seat 124 is exposed in the head 104. The bottom blade seat 124 may be provided on the frame 114 of the head 104. In a second step shown in FIG. 18, a first blade 118*a* may be positioned on the bottom blade seat 124. The razor edge of the first blade 118*a* may be positioned to extend from the cover 104 to provide a cutting surface for shaving an individual's face or other body part. In one aspect, the first blade 118*a* may be a "half blade" created from a full double-edged razor blade, as described above.

Figure 20:
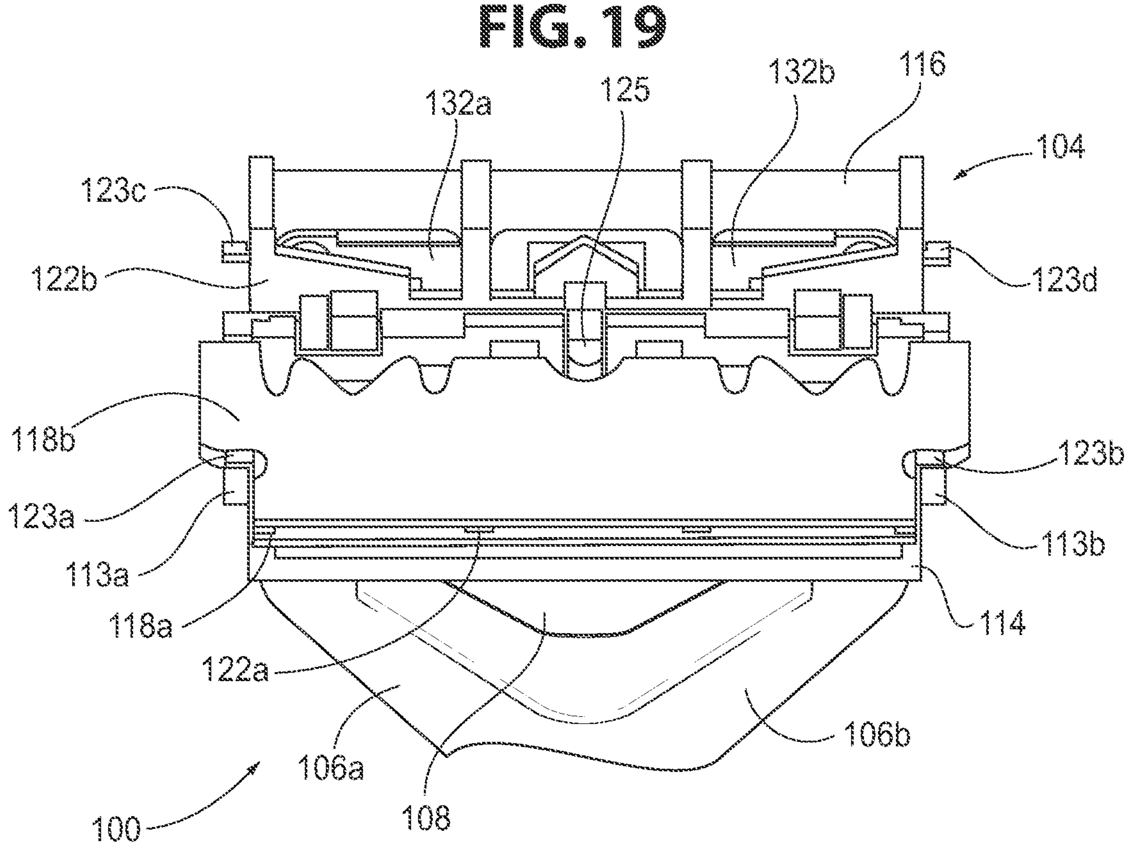
Figure 22:
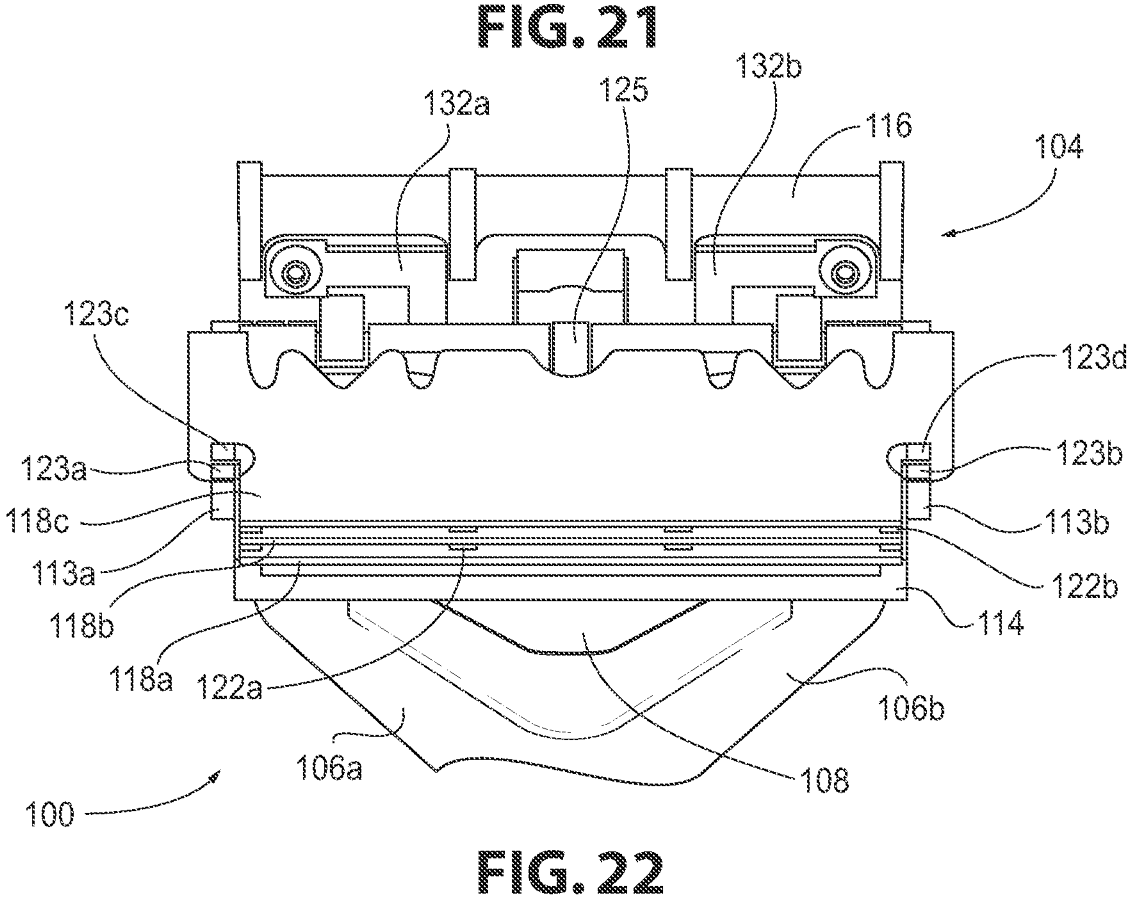
Figure 23:
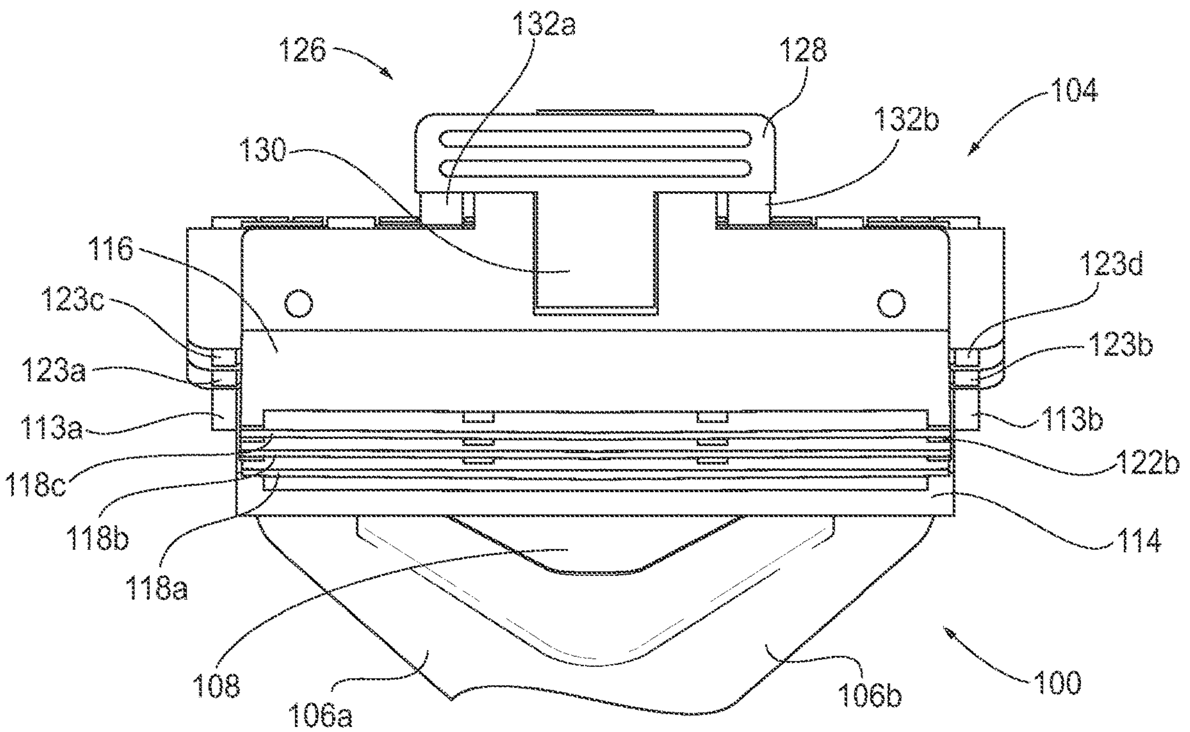

As shown in FIG. 19, after the first blade 118*a* has been positioned on the bottom blade seat 124, the separation member 122*a* may be rotated relative to the frame 114 to sit on or be positioned over the first blade 118*a*. As shown in FIG. 20, the second blade 118*b* may be positioned on a top surface of the separation member 122*a*. The razor edge of the second blade 118*b* may extend from the head 104 similar to the first blade 118*a* to provide a cutting surface for shaving an individual's face or body part. In one aspect, the second blade 118*b* may be the other "half blade" created from the full double-edged razor blade that also provided the first blade 118*a*. As shown in FIG. 21, the other separation member 122*b* may be rotated downwards to rest on top of the second blade 118*b*. Subsequently, as shown in FIG. 22, the third blade 118*c* may be placed on a top surface of the separation member 122*b*.

After all of the blades 118*a*, 118*b*, 118*c* have been inserted in the head 104, the cover 116 may be rotated relative to the frame 114 to close the head 104 of the razor 100. As the cover 116 is rotated, the locking mechanism 126 is snapped into place. In this step of the method, the retaining member 130 is held against the top blade 118*c* of the head 104 to compress or clamp the blades 118*a*, 118*b*, 118*c* and the separation members 122*a*, 122*b* between the cover 116 and the frame 114. Since the locking mechanism 126 is spring-loaded into the locked position, the locking mechanism 126 clamps the cover 116 to the frame 114 until an individual actuates the release lever 128 to open the cover 116 as described hereinabove.

Figure 32:
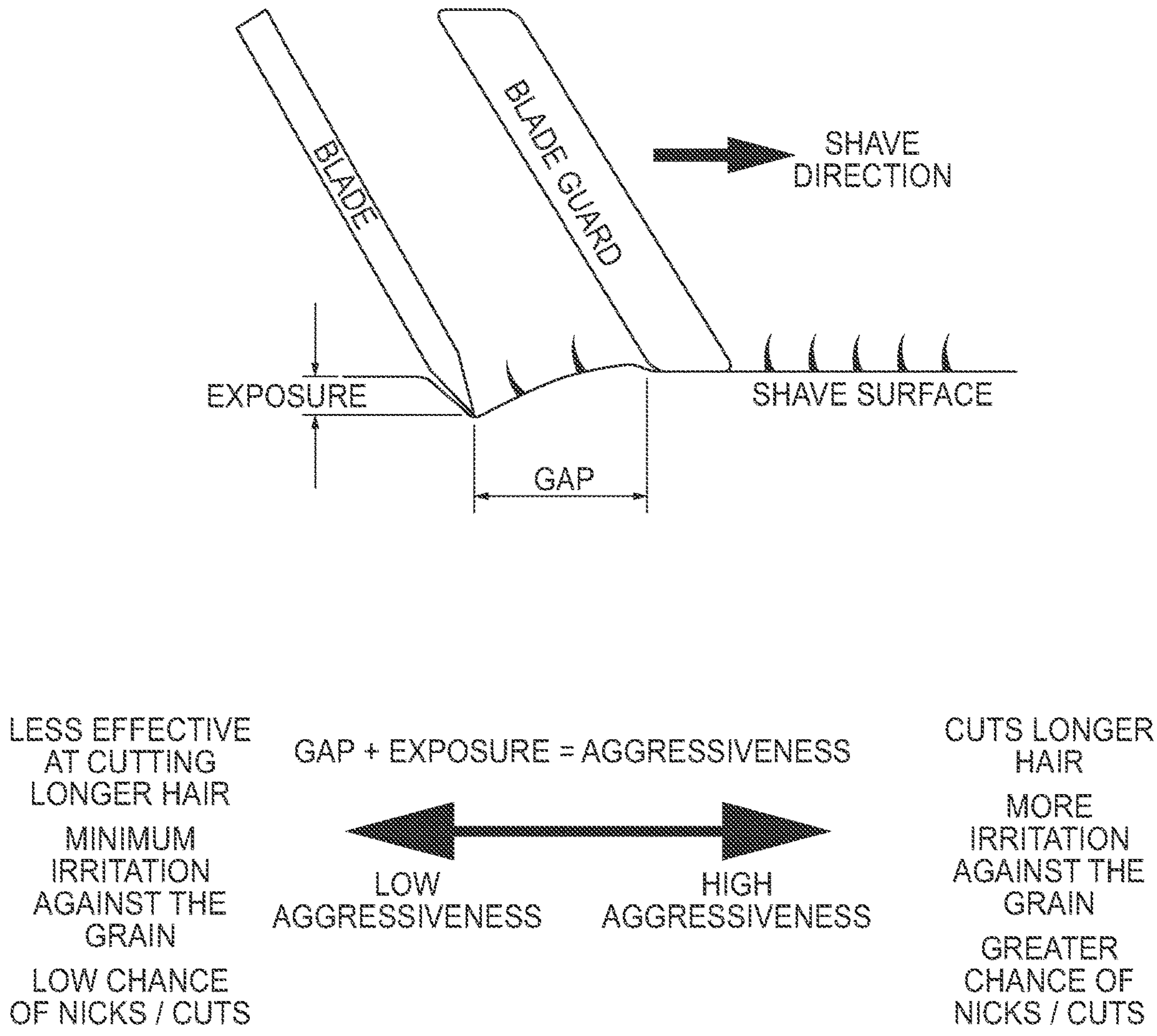
PRIOR ART FIG. 32
FIG. 32 is an illustration of a blade configuration that is used in current razors.

As described with reference to FIGS. 32-34, the aggressiveness of the razor 100 may be adjusted according to the preferences of the user. The aggressiveness of a razor is understood to be the configuration of how the blade is positioned relative to the geometry of the razor, which affects how the blade interacts and contacts the user's skin. Current razor blade configurations provided in current razors (shown schematically in FIG. 32) do not allow for adjustment of the aggressiveness of the razor. Typically, a blade guard is provided in front of the blade in the shave direction of the razor. A gap is formed between the blade guard and the blade, which affects the exposure of the blade to the user's skin. The exposure of the blade is understood to be the distance the blade protrudes into the shave surface or user's skin. When the blade exposure is high, the aggressiveness of the razor is high, which gives the user a closer shave. When the blade exposure is low, the aggressiveness of the razor is also low and the shaving process is safer but the shave is not as close to the user's skin. Therefore, the aggressiveness of the razor is determined by the exposure of the blade and the gap between the blade and the blade guard. A razor with a smaller the gap and less exposure of the blade is considered to provide a less aggressive shave. With a low aggressiveness, the razor is less effective at cutting longer hair but there may be reduced irritation against the grain when shaving and there is a lower chance of cutting the user's skin during shaving as compared to more aggressive razors. Razors with a large gap and greater exposure of the blade exhibit higher aggressiveness of shaving. With high aggressiveness, the razor can cut longer hair, however, more irritation can be experienced against the grain when shaving and the chance of cutting the user's skin during shaving is greater.

Figure 33:
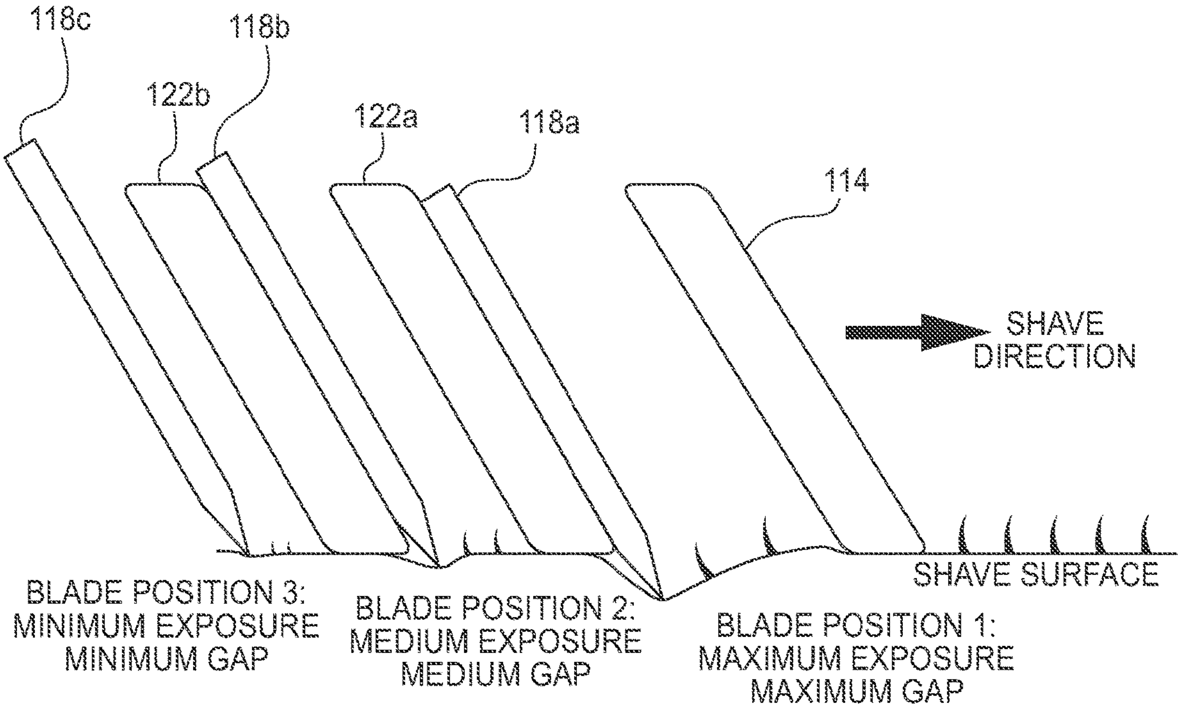
FIG. 33 is an illustration of a blade configuration that is used by the razor of FIG. 11.
Figure 34:
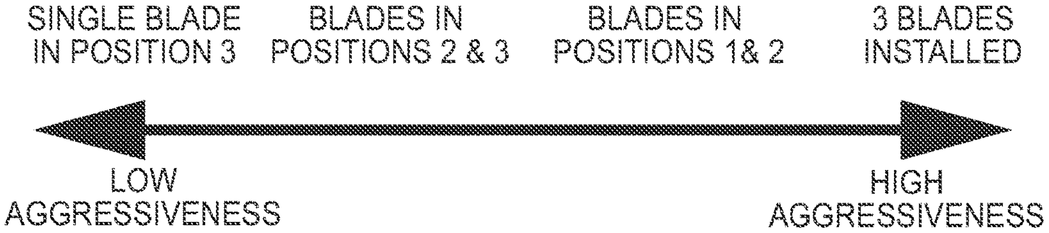
FIG. 34 is a graphical illustration of the aggressiveness of the razor of FIG. 11 based on the number of blades used and the position of the blades in the razor.

With reference to FIGS. 33 and 34, the aggressiveness of the razor 100 described herein may be adjusted by the user according to his/her skin condition and/or preferences for shaving. The razor 100 provides at least three different blade positions for the user to choose from to adjust the aggressiveness of the razor 100. Depending on the number of blades and the position of the blades within the razor 100, the user can customize a preference level of aggressiveness. As schematically shown in FIG. 33, at the first blade position, the first blade 118*a* is positioned away from the frame 114 (also considered a first blade guard for this discussion). In the first blade position, a maximum exposure of the blade 118*a* and a maximum gap are provided between the first blade 118*a* and the first blade guard. In the second blade position, the second blade 118*b* (also considered a second blade guard for this discussion) is positioned closer to the first separation member 122*a* than the first blade 118*a* is positioned relative to the frame 114. Therefore, in the second blade position, a medium or intermediate exposure of the blade 118*b* and a medium or intermediate gap are provided between the second blade 118*b* and the second blade guard. In the third blade position, the third blade 118*c* is positioned proximate the second separation member 122*b* (also considered a third blade guard for this discussion), which is closer than the first blade 118*a* and second blade 118*b* are positioned relative to the frame 114 and the first separation member 122*a*, respectively. Therefore, in the third blade position, a minimum or low exposure of the blade 118*c* and a minimum or low gap are provided between the second blade 118*c* and the third blade guard.

By providing this blade aggressiveness adjustment feature on the razor 100, the user may configure the razor 100 to his/her specific preferences. With reference to FIG. 34, the aggressiveness of the razor 100 may be adjusted based on the number and position of the blades 118*a*-118*c* in the razor 100. For a high aggressiveness, all three blades 118*a*-118*c* may be used in the razor 100. For an intermediate aggressiveness of the razor 100, two blades may be used in the razor 100. For example, the first and second blades 118*a*, 118*b* may be provided in the razor 100 or the second and third blades 118*b*, 118*c* may be provided in the razor 100. For a low aggressiveness of the razor 100, only one of the blades 118*a*, 118*b*, or 118*c* may be provided in the razor 100. It is also to be understood that the aggressiveness of the razor 2 illustrated in FIGS. 1-10 may also be adjusted in a similar manner as described above.

Figure 35:
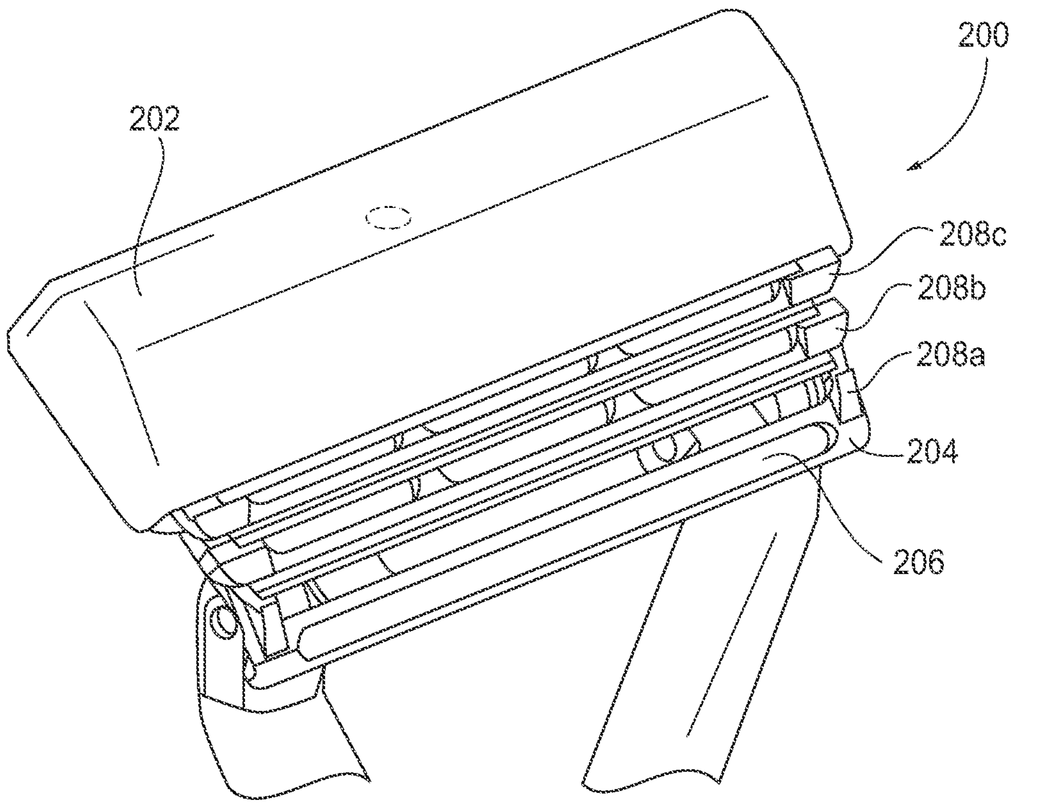
FIG. 35 is a bottom perspective view of a head of a razor according to another embodiment of the present disclosure.

With reference to FIGS. 35-39, another aspect of the razor head 200 is described. This aspect of the razor head 200 is configured and operates in substantially the same way as the razor heads 6, 104 described above but with several differences that are described below. In this aspect, the cover 202 is configured to cover each razor blade that is used in the razor head 200. The cover 202 is wider (as measured along the longest dimension of the cover 202) than the razor blades used in the razor head 200 so that the razor blades are fully enclosed within the razor head 200 and not exposed to the user, as compared to the razor blades 18*a*, 18*b*, 118*a*-118*c* of the razors 2, 100 that may extend outside of the respective covers 16, 116. Another feature of this aspect of the razor head 200 is the shaving edge includes an extension member 204. The extension member 204 defines a recessed portion 206 that provides a surface on the razor head 200 that pulls the user's hair up and away from the user's face or body part prior to the razor blades cutting the user's hair. By raising the user's hair up and away from the user's skin surface, the razor blades cut closer to the user's skin to provide a smoother shave for the individual. As shown in FIG. 35, the recessed portion 206 may extend across substantially the entire width of the extension member 204. In another aspect, the recessed portion 206 may only extend across a portion of the extension member 204. In another aspect, several recessed portions 206 may be spaced out across the width of the extension member 204. This aspect of the razor head 200 also includes elongated stop members 208*a*-208*c* to provide a protection structure which may cover the corners of the razor blades. Elongated stop members 208*a*-208*c* protect the corners of the razor blades within the razor head 200, which keeps the corners from scratching or cutting the user.

Figure 36:
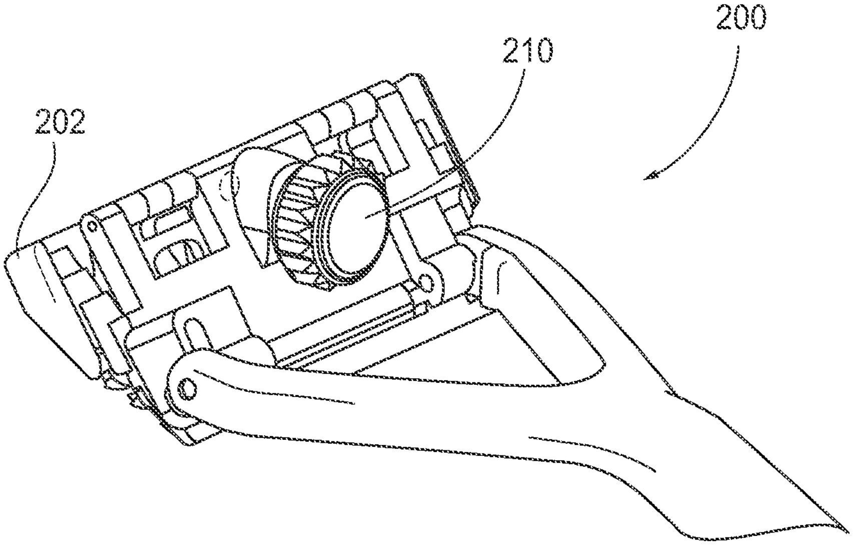
FIG. 36 is a top perspective view of the head of the razor of FIG. 35.
Figure 37:
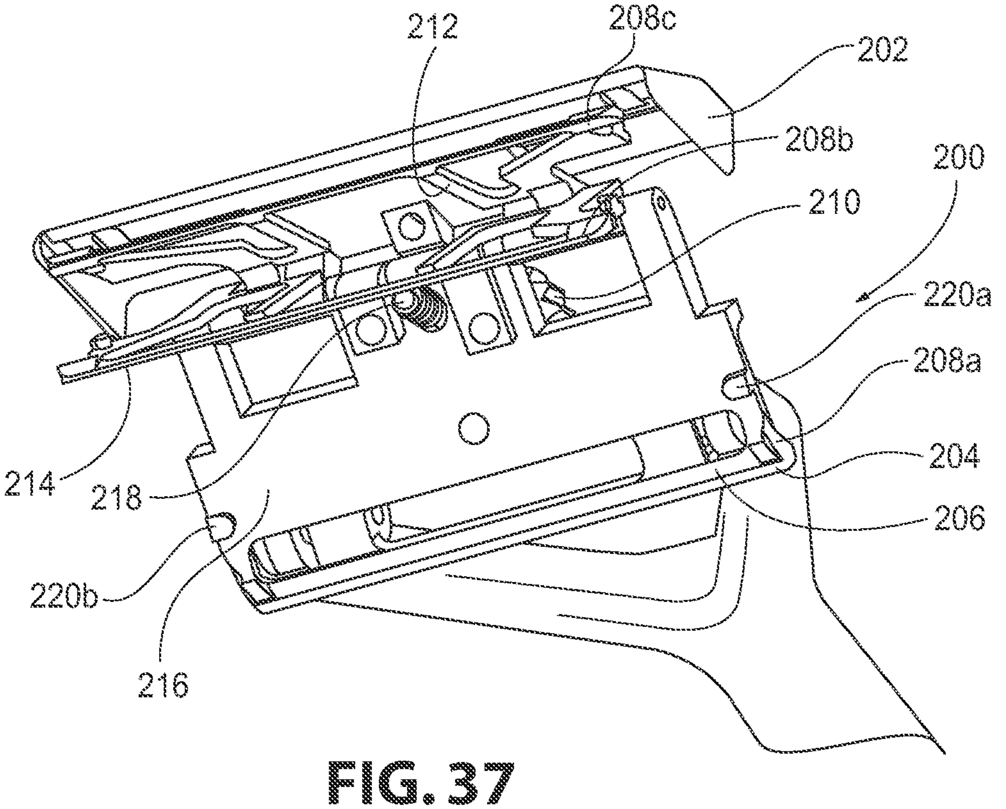
FIG. 37 is a bottom perspective view of the head of the razor of FIG. 35 shown in an open position without razor blades.
Figure 38:
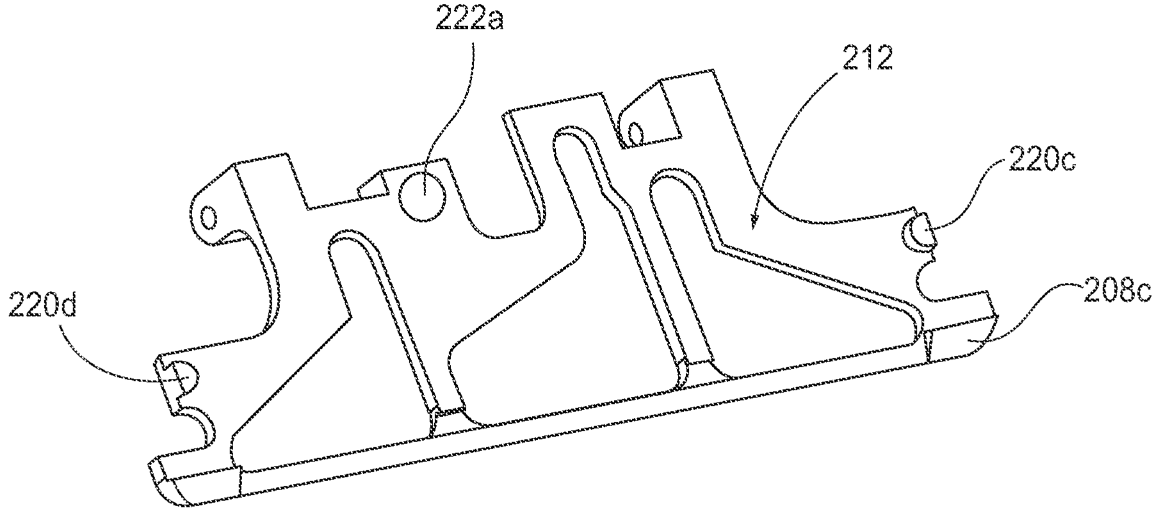
FIG. 38 is a top perspective view of a separation member used in the head of the razor of FIG. 35.
Figure 39:
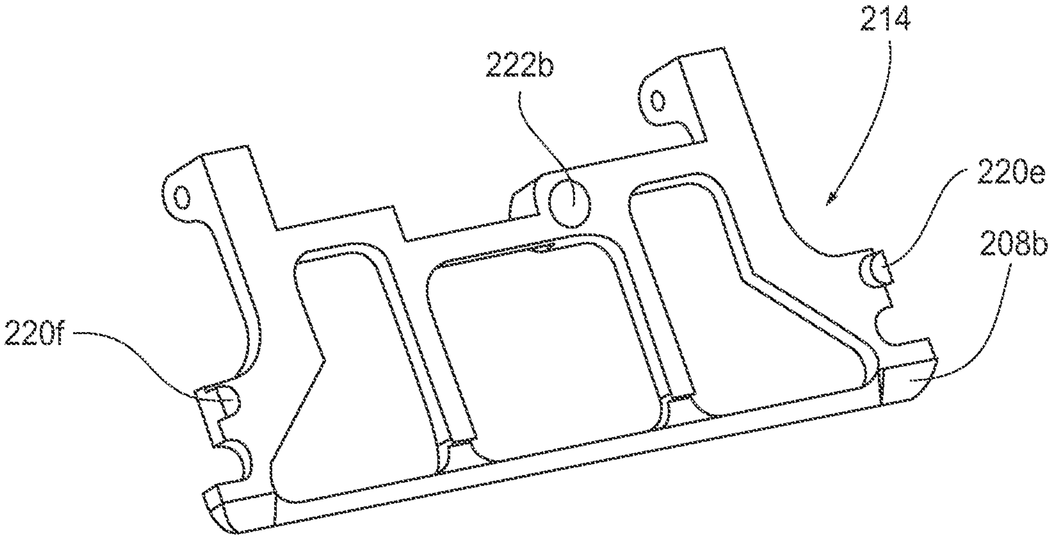
FIG. 39 is a top perspective view of another separation member used in the head of the razor of FIG. 35.

As shown in FIG. 36, this aspect of the razor head 200 utilizes a thumbscrew 210 to create a clamping force on the cover 202 to hold the razor blades within the razor head 200. The thumbscrew 210 is positioned and operates in the same manner as the thumbscrew 26 described above. In this aspect of the razor head 200, however, the threaded portion 218 of the thumbscrew 210 is threaded along the entire length of the thumbscrew 210 (shown in FIG. 37). As shown in FIGS. 37-39, this aspect of the razor head 200 also includes another type of separation member 212, 214. The separation members 212, 214 are positioned and operate in the same manner as the separation members 122*a*, 122*b* of the razor 100 described above. The separation members 212, 214 further reduce the quantity of material used to separate the razor blades in the razor head 200 so water can more efficiently flow through the razor head 200 during cleaning of the razor head 200. A frame 216 and the separation members 212, 214 may each include a pair of stop members 220*a*-220*f* to assist in retaining the razor blades 18*a* in the razor head 200. The profiled perimeters 18*a*''' of razor blade 18*a* may abut the stop members 220*a*-220*f* to prevent the razor blades 18*a* from moving side to side along the longest dimension of the razor head 200 and forward and back in the razor head 200. Therefore, the razor blades are prevent from moving forwards and backwards within the razor head 200 and are prevent from moving left and right within the razor head 200. Similar to the separation members 122*a*, 122*b* of the razor 100, magnets 222*a*, 222*b* may be provided on the separation members 212, 214 to assist in retaining the razor blades within the razor head 200.

A summary of the disclosure is provided in the following clauses.

Clause a: A shaving razor, comprising a handle, a head pivotally attached to the handle, the head including a frame and a cover pivotally attached to the frame, and at least one razor blade separation member provided between the frame and the cover of the head.

Clause b: The shaving razor of clause a, wherein the at least one separation member is movable relative to at least one of the frame and the cover of the head.

Clause c: The shaving razor of clause a or b, further comprising a releasable locking mechanism provided on the head and configured to hold the frame and cover together.

Clause d: The shaving razor of any of clause c, the releasable locking mechanism comprising a thumbscrew, a shaft extending from the thumbscrew and through the frame, the separation member, and the cover, and a threaded portion provided on an end of the shaft opposite the thumbscrew, wherein the threaded portion is removably threaded into the cover.

Clause e: The shaving razor of clause c, the releasable locking mechanism comprising a release lever, a retaining member extending from the release lever, and at least one spring member positioned on the retaining member, wherein the at least one spring member creates a biasing force on the locking mechanism to keep the locking mechanism in a locked position until the release lever is actuated.

Clause f: The shaving razor of clause c, the releasable locking mechanism comprising at least one magnet positioned on the cover, and at least one magnet positioned on the frame, where the at least one magnet on the cover is configured to create a magnetic connection between the at least one magnet on the frame to hold the cover and the frame together in a locked position.

Clause g: The shaving razor of any of clauses a-f, further comprising at least one razor blade provided in the head.

Clause h: The shaving razor of clause g, wherein the at least one razor blade comprises at least two razor blades positioned on opposing sides of the separation member.

Clause i: The shaving razor of clause h, wherein a stepped locking abutment extends from the frame and is configured to position the at least two razor blades in a stepped arrangement within the head.

Clause j: The shaving razor of clause h or i, wherein the razor blades are removably provided within the head.

Clause k: The shaving razor of any of clauses a-j, wherein a dimension of a first gap defined between the at least one separation member and the frame is different from a dimension of a second gap defined between the at least one separation member and the cover.

Clause l: The shaving razor of any of clauses a-k, wherein at least one magnet is positioned on the at least one separation member.

Clause m: The shaving razor of any of clauses a-l wherein the at least one separation member includes at least one stop member that extends therefrom, and the frame includes at least one stop member that extends therefrom, the stop members being configured to retain a razor blade on each of the at least one separation member and the frame.

Clause n: The shaving razor of clause m, wherein the at least one stop member extending from the frame is positioned closer to a shaving edge of the shaving razor than the at least one stop member extending from the at least one separation member.

Clause o: The shaving razor of any of clauses a-n, wherein the frame includes a shaving edge comprising an extension member, the extension member defining a recessed portion that lifts a user's hair from his/her skin during shaving.

Clause p: A shaving razor, comprising a handle and a head pivotally attached to the handle, wherein the head is configured to receive at least two independently replaceable razor blades.

Clause q: The shaving razor of clause p, wherein each replaceable razor blade comprises a blade body that tapers to at least one razor edge.

Clause r: The shaving razor of clause p or q, further comprising at least one separation member provided between a frame and a cover of the head, such that the replaceable razor blades are receivable on opposing sides of the separation member.

Clause s: The shaving razor of clause r, wherein the at least one separation member includes at least one stop member that extends therefrom, and the frame includes at least one stop member that extends therefrom, wherein the stop members are configured to retain a razor blade on each of the at least one separation member and the frame, and wherein the at least one stop member extending from the frame is positioned closer to a shaving edge of the shaving razor than the at least one stop member extending from the at least one separation member.

Clause t: The shaving razor of clause r or s, wherein a dimension of a first gap defined between the at least one separation member and the frame is different from a dimension of a second gap defined between the at least one separation member and the cover.

While aspects of a razor are shown in the accompanying figures and described hereinabove in detail, other aspects will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A shaving razor, comprising:

a handle;

a head pivotally attached to the handle, the head including a frame and a cover attached to the frame; and at least two razor blade separation members provided between the frame and the cover of the head, the at least two razor blade separation members being hingedly connected to the frame, wherein, when the cover is in an open position, each of the at least two razor blade separation members is independently movable relative to the cover, wherein a locking abutment extends from the frame and is configured to position at least two razor blades in a stacked arrangement within the head.

2. The shaving razor as claimed in claim 1, wherein the at least two razor blade separation members are movable relative to the frame of the head.

3. The shaving razor as claimed in claim 1, further comprising a releasable locking mechanism provided on the head and configured to hold the frame and cover together.

4. The shaving razor as claimed in claim 3, wherein the releasable locking mechanism comprises a thumbscrew.

5. The shaving razor as claimed in claim 3, the releasable locking mechanism comprising:

a thumbscrew; and a shaft extending from the thumbscrew and through the frame, the separation member, and the cover.

6. The shaving razor as claimed in claim 3, the releasable locking mechanism comprising:

at least one magnet positioned on the cover; and at least one magnet positioned on the frame, wherein the at least one magnet on the cover is configured to create a magnetic connection between the at least one magnet on the frame to hold the cover and the frame together in a locked position.

7. The shaving razor as claimed in claim 1, further comprising at least one razor blade provided in the head.

8. The shaving razor as claimed in claim 7, wherein the at least one razor blade comprises at least one razor blade positioned between the at least two razor blade separation members.

9. The shaving razor as claimed in claim 8, wherein the razor blades are removably provided within the head.

10. The shaving razor as claimed in claim 1, wherein a dimension of a first gap defined between at least one of the at least two razor blade separation members and the frame is different from a dimension of a second gap defined between the at least one of the at least two razor blade separation members and the cover.

11. The shaving razor as claimed in claim 1, wherein at least one magnet is positioned on each of the at least two razor blade separation members.

12. The shaving razor as claimed in claim 1, wherein each of the at least two razor blade separation members includes at least one stop member that extends therefrom, and the frame includes at least one stop member that extends therefrom, each respective stop member being configured to retain a razor blade on each of the at least two razor blade separation members and the frame.

13. The shaving razor as claimed in claim 12, wherein the at least one stop member extending from the frame is positioned closer to a shaving edge of the shaving razor than the at least one stop member extending from each of the at least two razor blade separation members.

14. The shaving razor as claimed in claim 1, wherein the frame includes a shaving edge comprising an extension member, the extension member defining a recessed portion that lifts a user's hair from his/her skin during shaving.

* * * * *